(12) United States Patent
Park et al.

(10) Patent No.: US 9,318,070 B2
(45) Date of Patent: Apr. 19, 2016

(54) MOBILE TERMINAL AND METHOD OF CONTROLLING A MOBILE TERMINAL

(71) Applicant: LG ELECTRONICS INC., Seoul (KR)

(72) Inventors: Jiyoung Park, Seoul (KR); Sujin Kim, Seoul (KR); Jumin Chi, Seoul (KR); Jaeho Choi, Seoul (KR); Sunghye Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/671,988

(22) Filed: Nov. 8, 2012

(65) Prior Publication Data

US 2014/0062976 A1 Mar. 6, 2014

(30) Foreign Application Priority Data

Sep. 5, 2012 (KR) .................. 10-2012-0098294

(51) Int. Cl.
G06F 3/041 (2006.01)
G09G 5/00 (2006.01)
G09G 5/14 (2006.01)
G06F 1/16 (2006.01)
G06F 3/01 (2006.01)

(52) U.S. Cl.
CPC .............. *G09G 5/00* (2013.01); *G06F 1/1626* (2013.01); *G06F 1/1652* (2013.01); *G06F 3/011* (2013.01); *G09G 5/14* (2013.01); *G06F 2203/04803* (2013.01); *G09G 2354/00* (2013.01); *G09G 2380/02* (2013.01)

(58) Field of Classification Search
CPC .............................. G06F 1/1652; G06F 3/0415
USPC .................................. 345/156, 173, 174, 650
See application file for complete search history.

(56) References Cited

U.S. PATENT DOCUMENTS

| | | | |
|---|---|---|---|
| 6,256,008 B1* | 7/2001 | Sparks et al. ................. | 345/618 |
| 2003/0227441 A1* | 12/2003 | Hioki et al. ................... | 345/156 |
| 2004/0008191 A1* | 1/2004 | Poupyrev et al. ............. | 345/184 |
| 2007/0031115 A1* | 2/2007 | Oshikiri et al. ................ | 386/95 |
| 2010/0141605 A1* | 6/2010 | Kang et al. .................... | 345/174 |
| 2010/0299592 A1* | 11/2010 | Zalewski et al. .............. | 715/243 |
| 2011/0107272 A1* | 5/2011 | Aguilar ......................... | 715/853 |

* cited by examiner

*Primary Examiner* — Calvin C Ma
(74) *Attorney, Agent, or Firm* — KED & Associates LLP

(57) ABSTRACT

A terminal includes a sensor to sense bending of a flexible display and a controller to control display of information on the display. The controller divides a first screen on the display into at least first and second regions when bending of the display is detected and displays at least a portion of a second screen in a space located between the first and second regions.

26 Claims, 44 Drawing Sheets (a)　　　　　　　　　(b)

(a)　　　(b)

(a)        (b)

(a)    (b)

(a)          (b)

(a)    (b)

(a)             (b)

(a)　　　　　　　　(b)

플리킹

(a)　　　(b)

(a)  (b)

(a)            (b)

MOBILE TERMINAL AND METHOD OF CONTROLLING A MOBILE TERMINAL

This application claims the benefit of and priority to Korean Patent Application No. 10-2012-0098294 filed on Sep. 5, 2012, the entire contents of which are hereby incorporated by reference.

BACKGROUND

1. Field

One or more embodiments described herein relate to processing information in an electronic device.

2. Background

Smart phones, notebook computers, gaming systems and other electronic devices use one or more of a keypad, mouse or other types of conventional input devices for data entry. As the computing power of these devices evolve and as consumer demand increases for additional functionality, different ways of inputting and/or controlling display of information will be needed.

SUMMARY

According to one embodiment, a mobile terminal includes a flexible display, a sensing unit for sensing the bending of the flexible display, and a controller for dividing a first screen into a plurality of regions and moving the plurality of regions to display a second screen between the plurality of regions when the bending of the flexible display is generated on displaying the first screen.

According to another embodiment, a mobile terminal includes a flexible display, a sensing unit for sensing the bending of the flexible display, and a controller for dividing a first screen into a plurality of regions, moving the plurality of regions to display a second screen between the plurality of regions, and controlling the movement of the plurality of regions according to the bending degree of the flexible display so that a display size of the second screen is altered, when the bending of the flexible display is generated on displaying the first screen.

According to another embodiment, a method of controlling a mobile terminal includes displaying a first screen, sensing the generation of the bending of a flexible display, dividing the first screen into a plurality of regions, and moving the plurality of regions to display a second screen between the plurality of regions.

BRIEF DESCRIPTION OF THE DRAWINGS

FIGS. 6A to 11B show examples of a second screen to be displayed according to the first screen in the mobile terminal.

FIGS. 18A to 19B show examples of entering the second screen using a touch gesture in the mobile terminal.

FIGS. 20A to 21B show examples of screens displayed upon restoring a flexible display in a unfolded state.

FIGS. 23A to 24B show examples of displaying a second screen when bending is generated in the mobile terminal.

FIGS. 26A to 27B show examples of operations performed by touching items in the second screen in the mobile terminal.

FIGS. 32A to 33B show examples of an operation performed by selecting any one item based on the bending state of the flexible display in a screen lock state of the mobile terminal.

DETAILED DESCRIPTION

Figure 1:
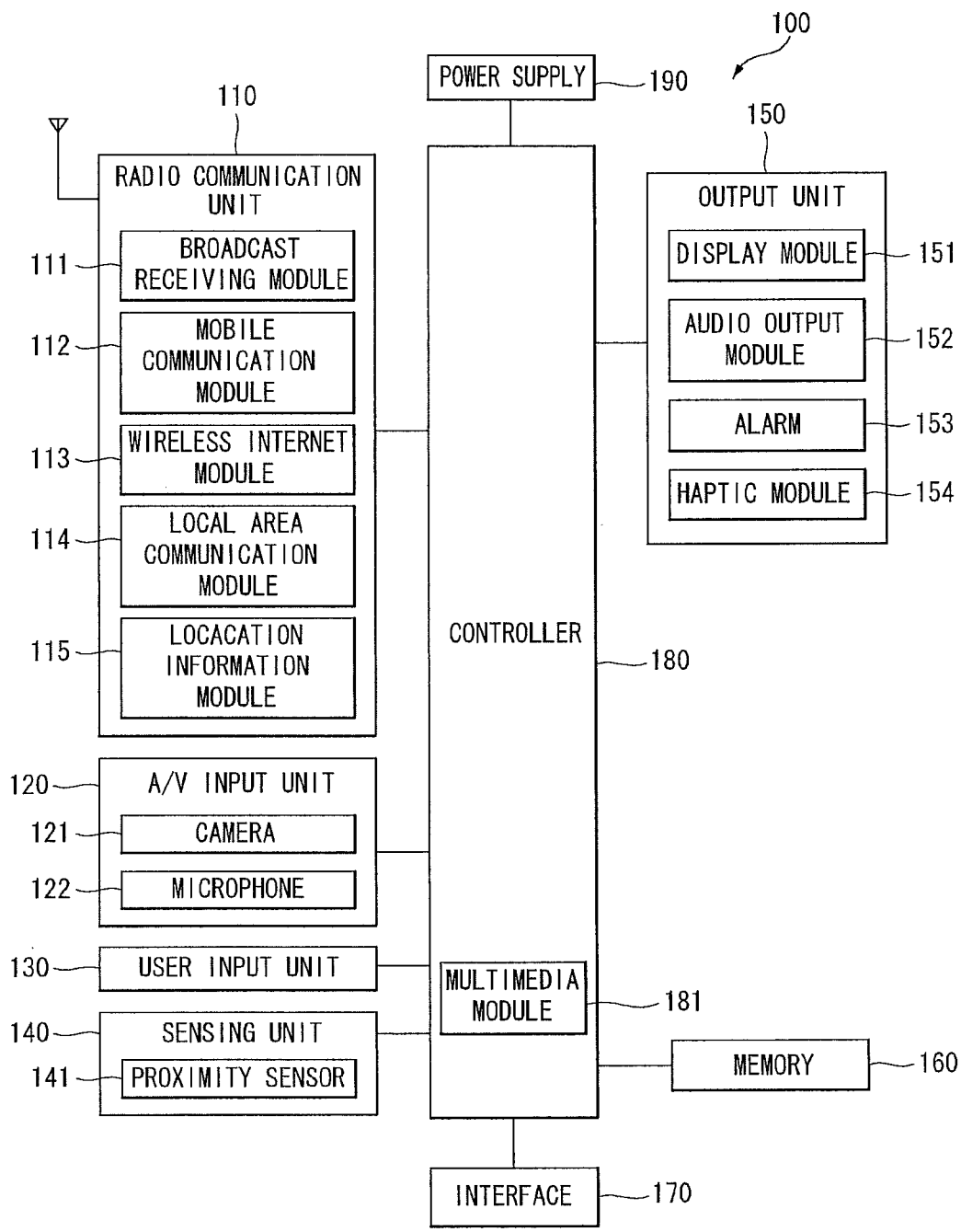
FIG. 1 shows one embodiment of a mobile terminal.

FIG. 1 shows one embodiment of a mobile terminal 100 which includes a wireless communication unit 110, an audio/video (A/V) input unit 120, a user input unit 130, a sensing unit 140, an output unit 150, a memory 160, an interface unit 170, a controller 180, and a power supply 190. The mobile terminal may be a cellular phone, a smart phone, a laptop computer, a digital broadcasting terminal, a personal digital assistant (PDA), a portable multimedia player (PMP), gaming system, a navigation system, or any other electronic device (portable or stationary) which is capable of displaying information.

Not all of the components shown in FIG. 1 are essential, and the number of components included in the mobile terminal 100 may be varied. The components of the mobile terminal 100, as illustrated with reference to FIG. 1 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a local area (or short-range) communication module 114, and a location information (or position-location) module 115.

The broadcast receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, wireless broadcasting signals, and data broadcasting signals, but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in any of various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcasting signals using various broadcasting systems. More particularly, the broadcast receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO™) system, a DVB-H system, and an integrated services digital broadcast-terrestrial (ISDB-T) system. The broadcast receiving module 111 may receive signals from broadcasting systems providing broadcasting signals other than the above-described digital broadcasting systems.

The broadcasting signals and/or broadcasting related information received through the broadcast receiving module 111 may be stored in the memory 160. The mobile communication module 112 may transmit/receive a wireless signal to/from at least one of a base station, an external terminal and a server on a mobile communication network. The wireless signal may include a voice call signal, a video call signal or data in various forms according to the transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro™), world interoperability for microwave access (Wimax™), high speed downlink packet access (HSDPA) and other technologies may be used as a wireless Internet technique.

The local area communication module 114 may correspond to a module for local area communication. Further, Bluetooth™, radio frequency identification (RFID), infrared data association (IrDA), ultra wideband (UWB) and/or Zig-Bee™ may be used as a local area communication technique.

The position-location module 115 may confirm or acquire the position of the mobile terminal 100. The position-location module 115 may acquire position information by using a global navigation satellite system (GNSS). The GNSS refers to a radio navigation satellite system that revolves around the earth and transmits reference signals to predetermined types of radio navigation receivers such that the radio navigation receivers may determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is one example of the position-location module 115. The GPS module 115 may calculate information regarding distances between one point or object and at least three satellites and information regarding a time when the distance information is measured and apply trigonometry to the acquireed distance information to acquire three-dimensional position information on the point or object according to latitude, longitude and altitude at a predetermined time. A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving pictures acquireed by an image sensing unit in a video call mode or a photographing mode. The processed image frames may be displayed on a display module 151 which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electronic audio data. The audio data may then be converted into a form that may be transmitted to a mobile communication base station through the mobile communication module 112 and output in the call mode. The microphone 122 may employ various noise removal algorithms (or noise canceling algorithms) for removing or reducing noise generated when the external audio signal is received.

The user input unit 130 may receive input data required for controlling the mobile terminal 100 from a user. The user input unit 130 may include a keypad, a dome switch, a touch pad (e.g., constant voltage/capacitance), a jog wheel, and a jog switch.

The sensing unit 140 may sense a current state of the mobile terminal 100, such as an open/closed state of the mobile terminal 100, a position of the mobile terminal 100, whether a user touches the mobile terminal 100, a direction of the mobile terminal 100, and acceleration/deceleration of the mobile terminal 100, and generate a sensing signal required for controlling the mobile terminal 100. For example, if the mobile terminal 100 is a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensing unit 141.

The output unit 150 may generate visual, auditory and/or tactile output and may include the display module 151, an audio output module 152, an alarm unit 153 and a haptic module 154. The display module 151 may display information processed by the mobile terminal 100. The display module 151 may display a user interface (UI) or a graphic user interface (GUI) related to a voice call when the mobile terminal 100 is in the call mode. The display module 151 may also display a captured and/or received image and a UI or a GUI when the mobile terminal 100 is in the video call mode or the photographing mode.

In addition, the display module 151 may include at least a liquid crystal display, a thin film transistor liquid crystal display, an organic light-emitting diode display, a flexible display or a three-dimensional display. Some of these displays may be of a transparent type or a light transmissive type. That is, the display module 151 may include a transparent display.

The transparent display may include a transparent liquid crystal display. The rear of the display module 151 may include a light transmissive type display. Accordingly, a user may be able to see an object located behind the body of the mobile terminal 100 through the transparent portion of the display unit 151 on the body of the mobile terminal 100.

The mobile terminal 100 may also include at least two display modules 151. For example, the mobile terminal 100 may include a plurality of display modules 151 that are arranged on a single face of the mobile terminal 100 and spaced apart from each other at a predetermined distance or that are integrated together. The plurality of display modules 151 may also be arranged on different sides of the mobile terminal 100.

Further, when the display module 151 and a touch-sensing sensing unit (hereafter referred to as a touch sensing unit) form a layered structure that is referred to as a touch screen, the display module 151 may be used as an input device in addition to an output device. The touch sensing unit may be in the form of a touch film, a touch sheet, or a touch pad, for example.

The touch sensing unit may convert a variation in pressure, applied to a specific portion of the display module 151, or a variation in capacitance, generated at a specific portion of the display module 151, into an electric input signal. The touch sensing unit may sense pressure, position, and an area (or size) of the touch.

When the user applies a touch input to the touch sensing unit, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensing unit 141 of the sensing unit 140 may be located in an internal region of the mobile terminal 100, surrounded by the touch screen, or near the touch screen. The proximity sensing unit 141 may sense the presence of an object approaching a predetermined sensing face or an object located near the proximity sensing unit using an electromagnetic force or infrared rays without mechanical contact. The proximity sensing unit 141 may have a lifetime longer than a contact sensing unit and may thus be more appropriate for use in the mobile terminal 100.

The proximity sensing unit 141 may include a transmission type photoelectric sensing unit, a direct reflection type photoelectric sensing unit, a mirror reflection type photoelectric sensing unit, a high-frequency oscillating proximity sensing unit, a capacitive proximity sensing unit, a magnetic proximity sensing unit, and/or an infrared proximity sensing unit. A capacitive touch screen may be constructed such that proximity of a pointer is detected through a variation in an electric field according to the proximity of the pointer. The touch screen (touch sensing unit) may be considered as a proximity sensing unit 141.

For the convenience of description, an action in which a pointer approaches the touch screen without actually touching the touch screen may be referred to as a proximity touch, and an action in which the pointer is brought into contact with the touch screen may be referred to as a contact touch. The proximity touch point of the pointer on the touch screen may correspond to a point of the touch screen at which the pointer is perpendicular to the touch screen.

The proximity sensing unit 141 may sense the proximity touch and a proximity touch pattern (e.g., a proximity touch distance, a proximity touch direction, a proximity touch velocity, a proximity touch time, a proximity touch position, a proximity touch moving state). Information corresponding to the sensed proximity touch action and proximity touch pattern may then be displayed on the touch screen.

The audio output module 152 may output audio data received from the wireless communication unit 110 or stored in the memory 160 in a call signal receiving mode, a call mode or a recording mode, a speech recognition mode and a broadcast receiving mode. The audio output module 152 may output audio signals related to functions performed in the mobile terminal 100, such as a call signal incoming tone and a message incoming tone. The audio output module 152 may include a receiver, a speaker, and/or a buzzer. The audio output module 152 may output sounds through an earphone jack. The user may listen to the sounds by connecting an earphone to the earphone jack.

The alarm unit 153 may output a signal indicating generation (or occurrence) of an event of the mobile terminal 100. For example, alarms may be generated when a call signal or a message is received and when a key signal or a touch is input. The alarm unit 153 may also output signals different from video signals or audio signals, for example, a signal indicating generation of an event through vibration. The video signals or the audio signals may also be output through the display module 151 or the audio output module 152.

The haptic module 154 may generate various haptic effects that the user may feel. One of the haptic effects is vibration. The intensity and/or pattern of a vibration generated by the haptic module 154 may also be controlled. For example, different vibrations may be combined with each other and output or may be sequentially output.

The haptic module 154 may generate a variety of haptic effects including an effect attributed to an arrangement of pins vertically moving against a contact skin surface, an effect attributed to a jet force or a suctioning force of air through a jet hole or a suction hole, an effect attributed to a rubbing of the skin, an effect attributed to contact with an electrode, an effect of stimulus attributed to an electrostatic force, and an effect attributed to a reproduction of cold and warmth using an element for absorbing or radiating heat in addition to vibrations.

The haptic module 154 may not only transmit haptic effects through direct contact but may also allow the user to feel haptic effects through the user's fingers or arms. The mobile terminal 100 may also include a plurality of haptic modules 154.

The memory 160 may store a program for operating the controller 180 and temporarily store input/output data such as a phone book, messages, still images, and/or moving pictures. The memory 160 may also store data regarding various patterns of vibrations and sounds that are output from when a touch input is applied to the touch screen.

The memory 160 may include at least a flash memory, a hard disk type memory, a multimedia card micro type memory, a card type memory such as SD or XD memory, a random access memory (RAM), a static RAM (SRAM), a read-only memory (ROM), an electrically erasable programmable ROM (EEPROM), a programmable ROM (PROM) magnetic memory, a magnetic disk, or an optical disk. The mobile terminal 100 may also operate in association with a web storage performing the storage function of the memory 160 on the Internet.

The interface unit 170 may serve as a path to external devices connected to the mobile terminal 100. The interface unit 170 may receive data or power from the external devices, transmit the data or power to internal components of the mobile terminal 100, or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identity module (UIM), a subscriber identity module (SIM) and a universal subscriber identify module (USIM). An identification device including the user identification module may also be manufactured in the of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are provided to the mobile terminal 100. The various command signals or power input from the cradle may be used as signals for checking whether the mobile terminal 100 is correctly settled (or loaded) in the cradle.

The controller 180 may control overall operations of the mobile terminal 100. For example, the controller 180 may control and process voice communication, data communication and/or a video call. The controller 180 may also include a multimedia module 181 for playing a multimedia file. The multimedia module 181 may be included in the controller 180 as shown in FIG. 1 or may be separated from the controller 180.

The controller 180 may perform a pattern recognition process of recognizing handwriting input or picture-drawing input applied to the touch screen as characters or images. The power supply 190 may receive external power and internal power and provide power required for operating the components of the mobile terminal 100 under the control of the controller 180.

According to a hardware implementation, embodiments may be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented using the controller 180.

According to a software implementation, embodiments including procedures or functions may be implemented using a separate software module executing at least one function or operation. Software code may be implemented according to a software application written in an appropriate software language. The software codes may be stored in the memory 160 and executed by the controller 180.

Figure 2:
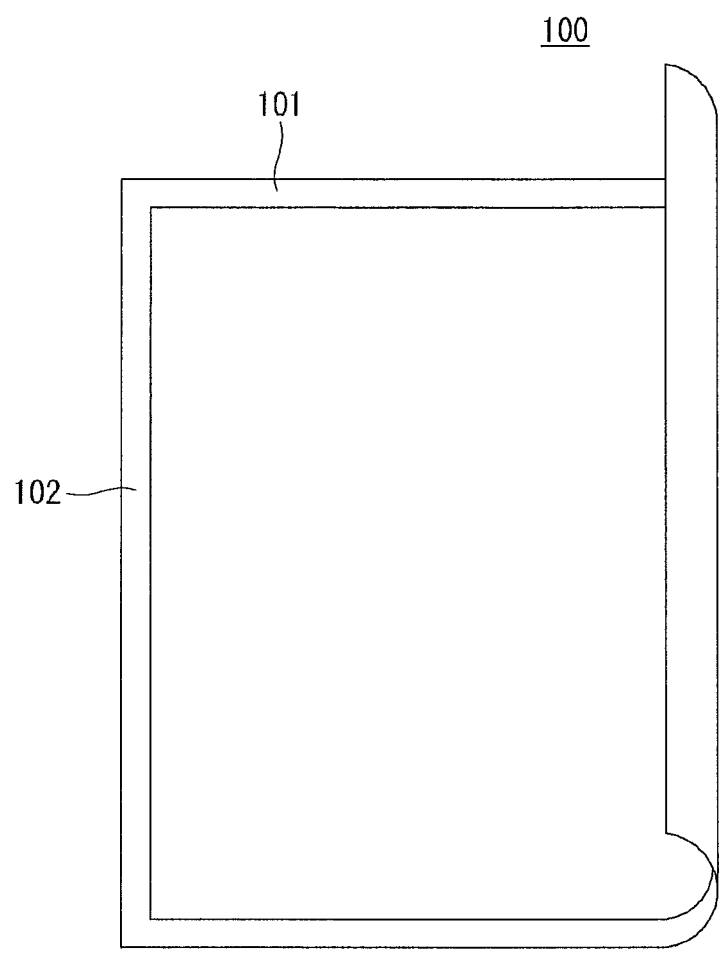
FIG. 2 shows a mobile terminal including a flexible display.

FIG. 2 is a perspective view for an example of a mobile terminal including a flexible display when seen from the front thereof. Referring to FIG. 2, the mobile terminal 100 includes one body. The body may include a case 101 and panel portion 102 for forming an appearance.

The case 101 may be formed by injecting synthetic resin, and implemented with bendable and windable, that is, flexible material as shown in FIG. 2. The inside of the case 101 may be disposed with electronic parts so as to configure a memory 150, a controller 180 and a power supply 190 etc.

A display module 151 occupies most of a principal plan of the panel portion 102. The display module 151 may be formed with the flexible display. Therefore, like the case 101, the panel portion 102 may be bended, winded or folded as shown in FIG. 2.

On the other hand, in the present application, an action for applying power to a body of the mobile terminal 100 in the direction of bending the body of the mobile terminal 100 is named "a folding gesture".

As shown in FIG. 2, when the display module 151 is implemented with the flexible display that enables physical deformation, the bending of the flexible display occurs when the folding gesture is inputted. Thus, the controller 180 may determine inputs such as the folding gesture based on a bending state of the flexible display.

In the present application, a sensing unit 140 may include a bend sensing unit for sensing the bending of the flexible display 151. The bend sensing unit may be adhered to the flexible display, and therefore uniformly distributed in the flexible display. For example, like an optical fiber, the bend sensing unit may be implemented with a way of uniformly applying the material capable of propagating signal to a display plane.

The bend sensing unit may output different signals according to the bending state of the flexible display 151. That is, the bend sensing unit may output different signals according to the position, region, direction, angle, and degree to be bent etc. when the flexible display 151 is bent or folded, and the controller 180 may acquire information for the bending state of the flexible display 151 based on the signals. The information for the bending state may include the position, region, degree, direction and angle etc. to be bent when the flexible display 151 is bent.

On the other hand, when the display module 151 is implemented with the display that does not enable physical deformation, the controller 180 may determine the inputs such as the folding gesture based on pressure applied to the body of the mobile terminal 100 by an user When the user grasps a specific region of the body of the mobile terminal 100, for example, both edge regions by hand and applies the pressure to it in the specific direction, the controller 180 may determine that the folding gesture is inputted by sensing the pressure applied to the both edge regions region.

In the present application, the sensing unit 140 may include a pressure sensing unit (a grip sensing unit) in the specific region of the body of the mobile terminal 100. When the user grasps the body of the mobile terminal 100 by hand, at least one pressure sensing unit may be disposed in the position applied with the pressure. The controller 180 detects the pressure applied to the body of the mobile terminal 100 by the user using the pressure sensing unit, and may determine whether the folding gesture is inputted, based on the detected pressure.

In the present application, the sensing unit 140 may include a gyroscope, an accelerometer, a magnetic sensing unit etc. for sensing a motion of the mobile terminal 100.

The gyroscope may acquire a rotation velocity or a angular velocity according to the rotation on the axis line of the mobile terminal 100, that is, the rotation of the mobile terminal 100. Further, the accelerometer may acquire the acceleration of gravity according to the motion of the mobile terminal 100. Further, the magnetic sensing unit, like a compass, may acquire the bearing of the mobile terminal 100.

The controller 180 may acquire the motion of the mobile terminal 100 based on at least any one of the angular velocity acquired by the gyroscope of the sensing unit 130, the acceleration of gravity acquired by the accelerometer, and the bearing of the mobile terminal 100 acquired by the magnetic sensing unit. Here, the motion of the mobile terminal may include a tilting, horizontal state and rotation etc. of the mobile terminal. Further, the motion of the mobile terminal 100 may include the bending velocity of flexible display 151.

Figure 3:
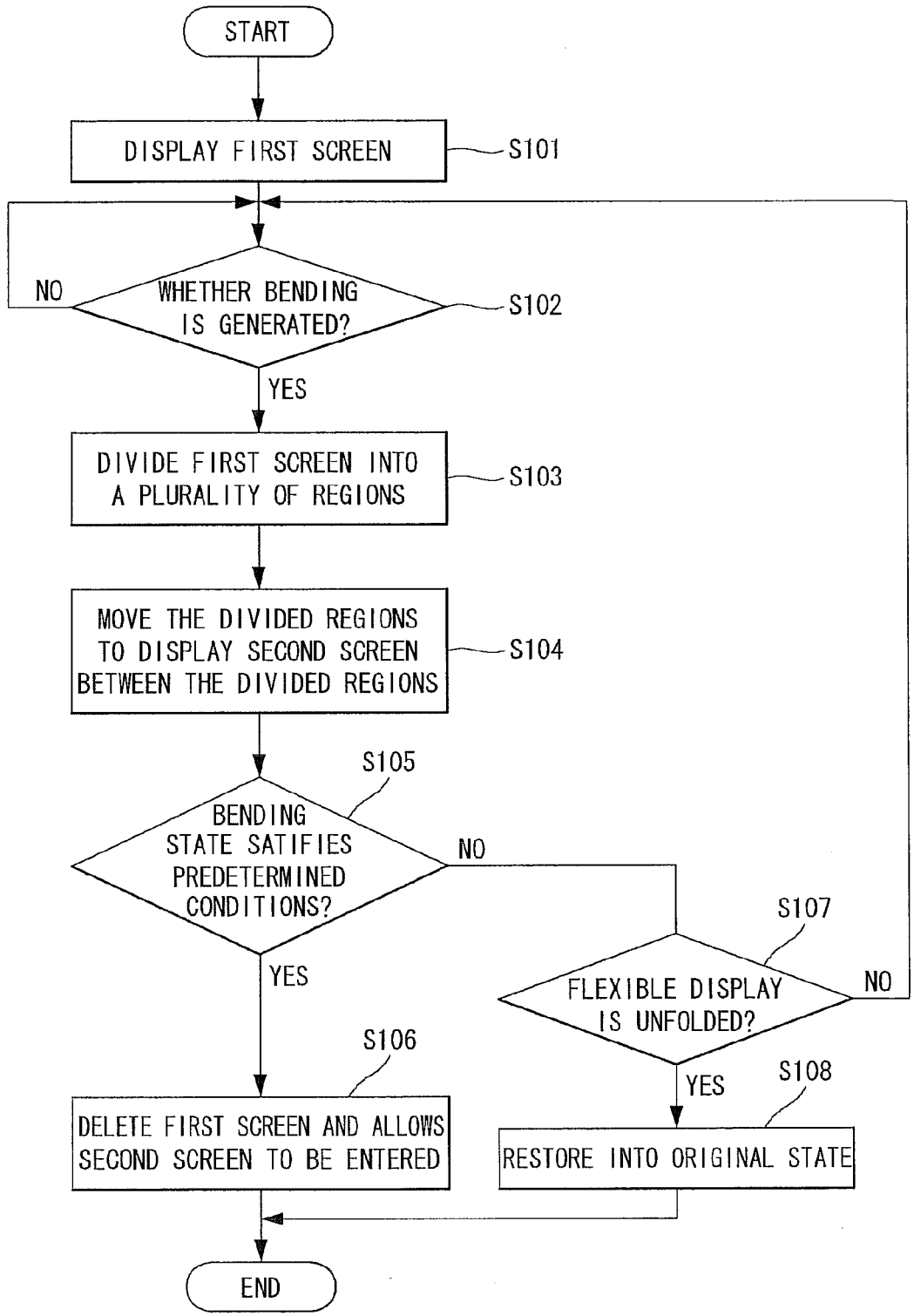
FIG. 3 shows one embodiment of a method for controlling a mobile terminal.

FIG. 3 is a flowchart showing a first embodiment of a method of controlling a mobile terminal, and FIGS. 4 to 21B explain the method shown in FIG. 3. Referring to FIG. 3, the controller 180 displays the first screen on the flexible display 151 (S101). The controller 180 may determine whether the bending of the flexible display 151 occurs, based on output signals of the bend sensing unit included in the sensing unit 140 (S102).

The controller 180 may determine that the bending of the flexible display 151 occurs, for example, when the bending degree of the flexible display 151 exceeds a threshold value, to distinguish the case that the flexible display 151 is bent unintentionally from the case that the flexible display 151 is bent when the folding gesture is inputted. It may be determined that the bending occurs even in the case to be altered into the state that the flexible display 151 is bent and the case to be altered into the state that the flexible display 151 is folded.

When the generation of the bending is sensed at the step S102, the controller 180 divides the first screen into a plurality of regions (S103). Further, the controller 180 gradually moves the plurality of divided regions to expose at least part of the second screen between the plurality of divided regions (S104).

In addition, the controller 180 persistently acquires the bending state of the flexible terminal 151 by the sensing unit 140, and determines whether the acquired bending state satisfies predetermined screen change conditions (S105).

Further, the controller 180 allows the second screen to be entered when the bending state satisfies the predetermined screen change conditions (S106). That is, the screen displayed by the flexible display 151 is switched from the first screen to the second screen.

On the other hand, the controller 180 checks whether the flexible display 151 is altered into the state before the bending occurs, that is, the unfolded state based on the output signal of the bend sensing unit included in the sensing unit 140 (S107). Further, on unfolding the flexible display 151, the first screen is restored into the state before the flexible display 151 is bent (S108). That is, the second screen is removed from the flexible display 151, and the divided regions of the first screen are coupled again and displayed.

At the step S103, the controller 180 may acquire the information for bending state including the bending region, the bending degree etc. based on the output signals of the bend sensing unit, and acquire the reference line becoming a base of dividing the first screen based on the bending region, the bending degree etc. For example, the controller 180 may acquire the reference line by connecting the points having the largest bending degree in the bent region.

On acquiring the reference line, the controller 180 divides the first screen centered on the reference line. The controller 180 may divide the first screen using a region dividing line, having a straight line, to be overlapped with the reference line. In addition, the controller 180 may divide the first screen using the region dividing line having a curved or broken line except the straight line. For example, the controller 180 may use a tearing line to be divided into the type of tearing the first screen, a break line to be divided into the type of breaking the first screen, etc. as the region dividing line.

Figure 4:
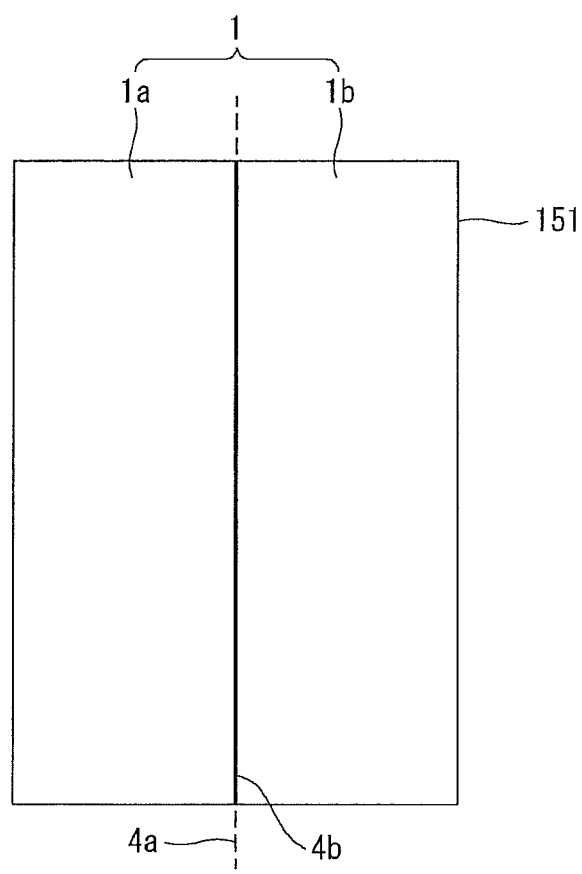
FIGS. 4 and 5 show examples of dividing a first screen based on a reference line.
Figure 5:
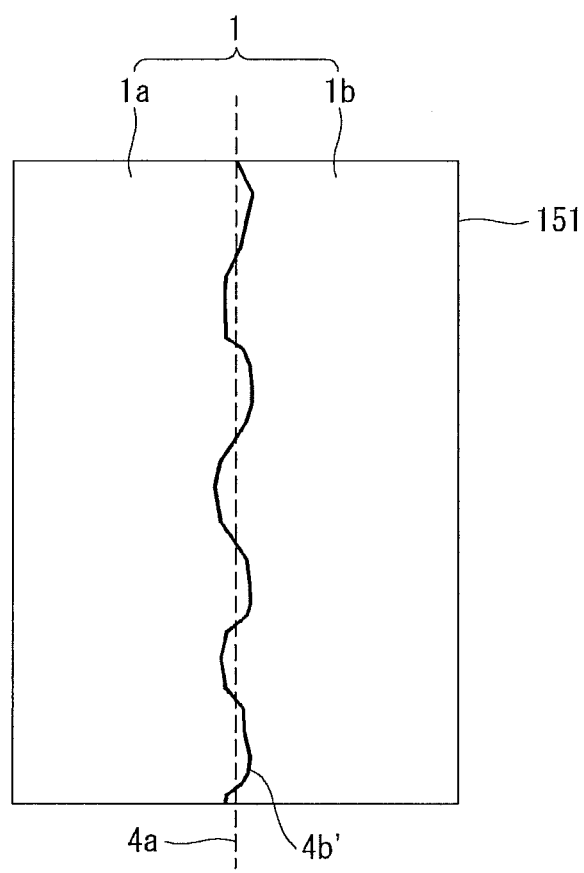

FIGS. 4 and 5 show examples of dividing the first screen based on the reference line. Referring to FIG. 4, the controller 180 acquires a reference line 4a for dividing a first screen 1 being displayed when the bending of the flexible display 151 occurs. Further, the first screen 1 is divided into a plurality of regions 1a, 1b using a region dividing line 4b, having the straight line, to be overlapped with the reference line 4a.

Referring to FIG. 5, the controller 180 acquires the reference line 4a for dividing the first screen 1 being displayed when the bending of the flexible display 151 occurs. Further, the tearing line, formed in case of dividing by tearing the first screen 1 based on the reference line 4a, is set as the region dividing line 4b'. Further, the first screen 1 is divided into a plurality of regions 1a, 1b using the region dividing line 4b' having the tearing line.

Referring back to FIG. 3, at the step S104, the second screen displayed on the screen may be implemented with various embodiments according to the first screen being displayed.

The first screen may be a screen related hierarchically to the second screen. For example, if the first screen is a lock screen, the second screen may be a home screen. Further, if the first screen is the home screen, the second screen may be a top menu screen.

The first screen may be the screen disposed back and forth to the second screen. For example, when the first screen is a lock screen, the second screen may be the screen being displayed lastly before entering a lock state. Further, for example, when the first screen is a web page, the second screen may be the web page that connects prior to the web page being displayed.

Further, for example, when the first screen is a specified page of an e-book or electronic document, the second screen may be a previous page or next page of a page being displayed.

Further, for example, when the first screen is a performance screen for a specific application on multitasking, the second screen may be a performance screen for a different application on multitasking.

Further, for example, when the first screen is a specific contents included in specific list, the second screen is included in the same list as contents being displayed and may be the contents disposed in the front or back of the contents being displayed.

Figure 6:
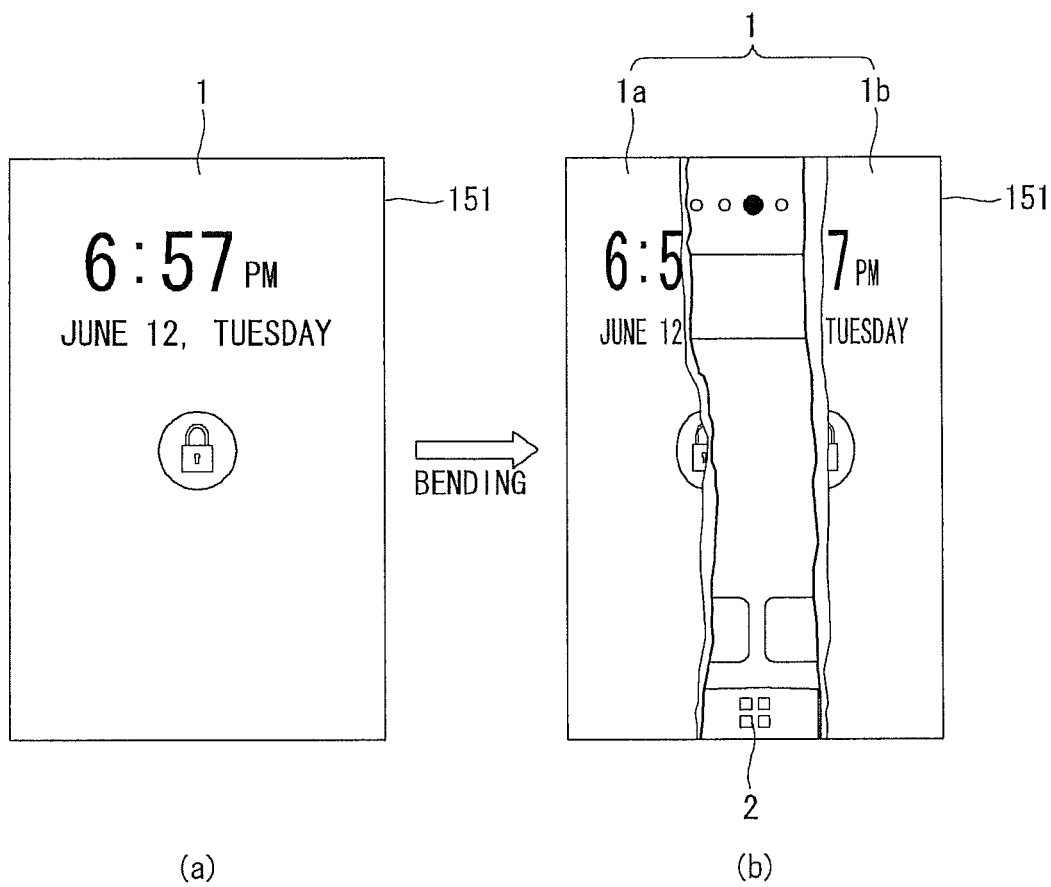
Figure 7:
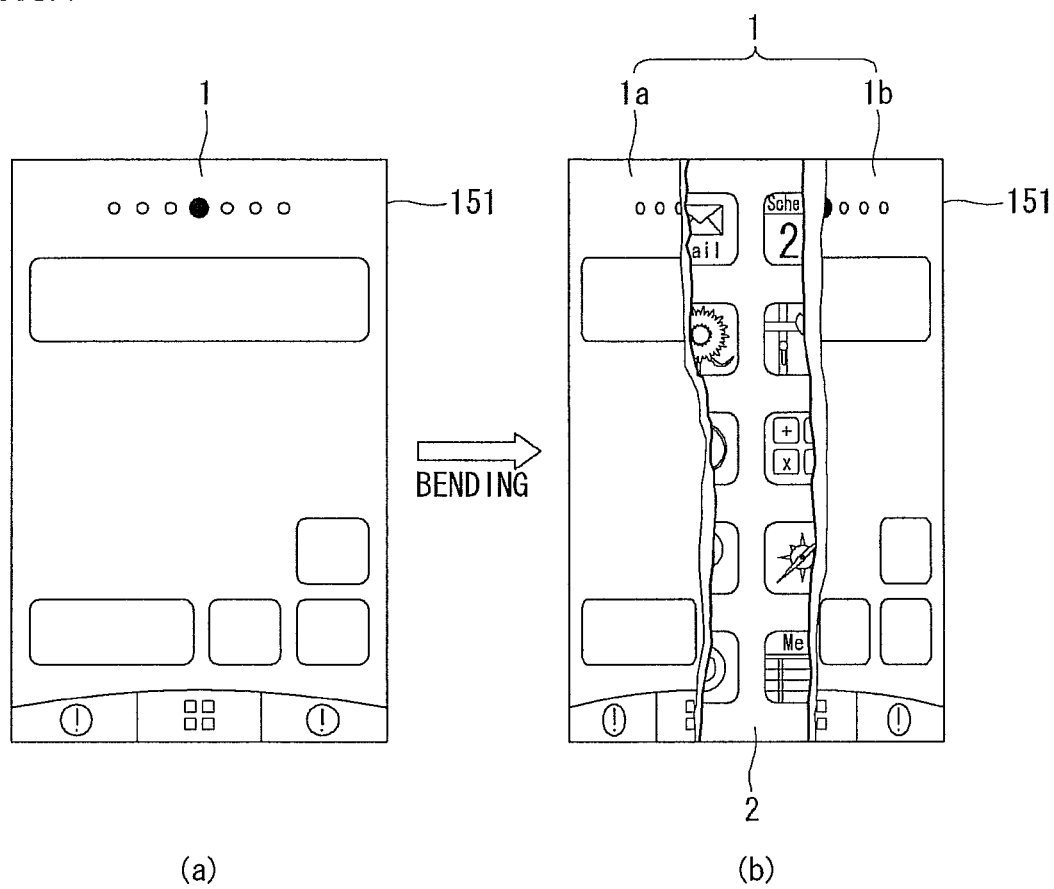
Figure 8:
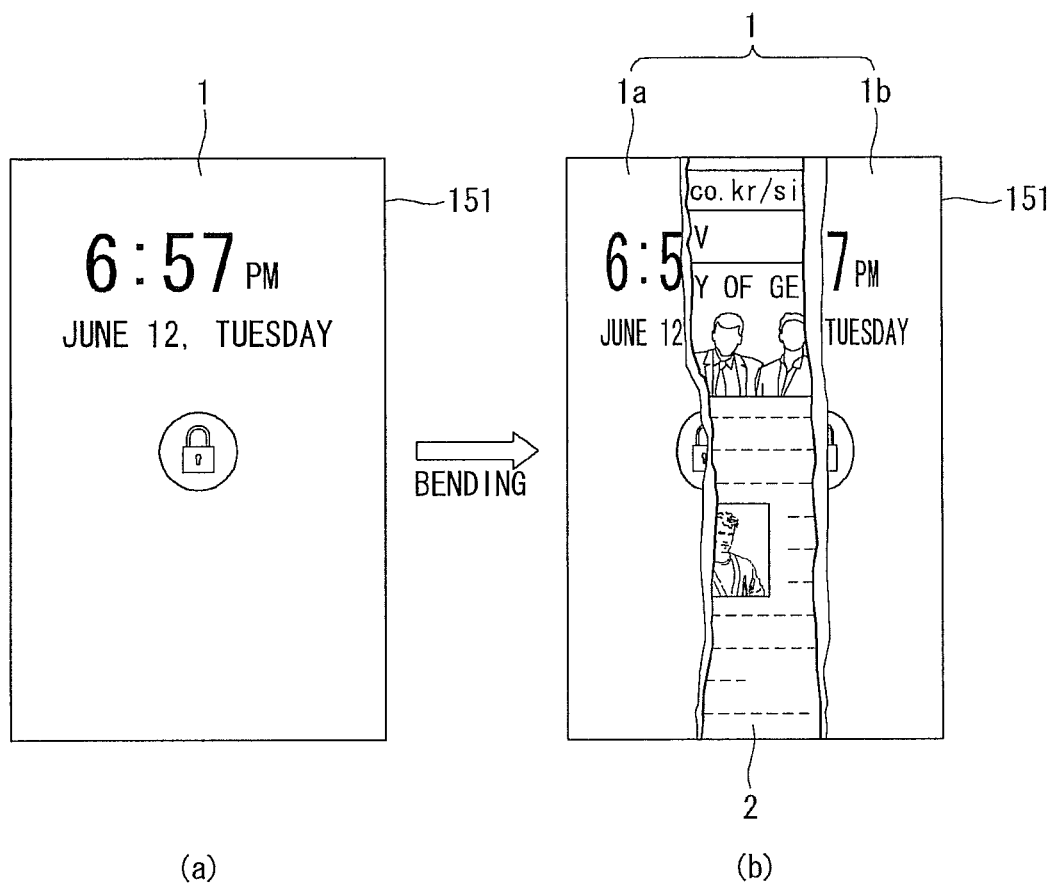
Figure 9:
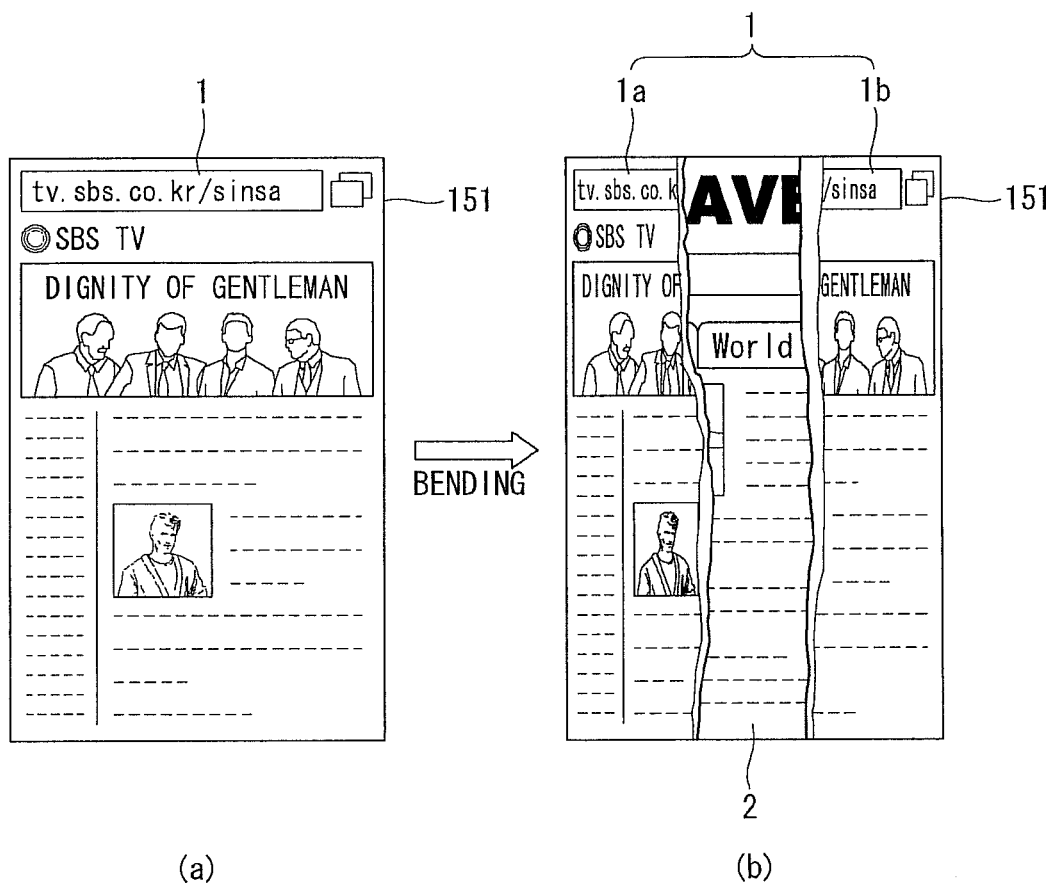
Figure 10:
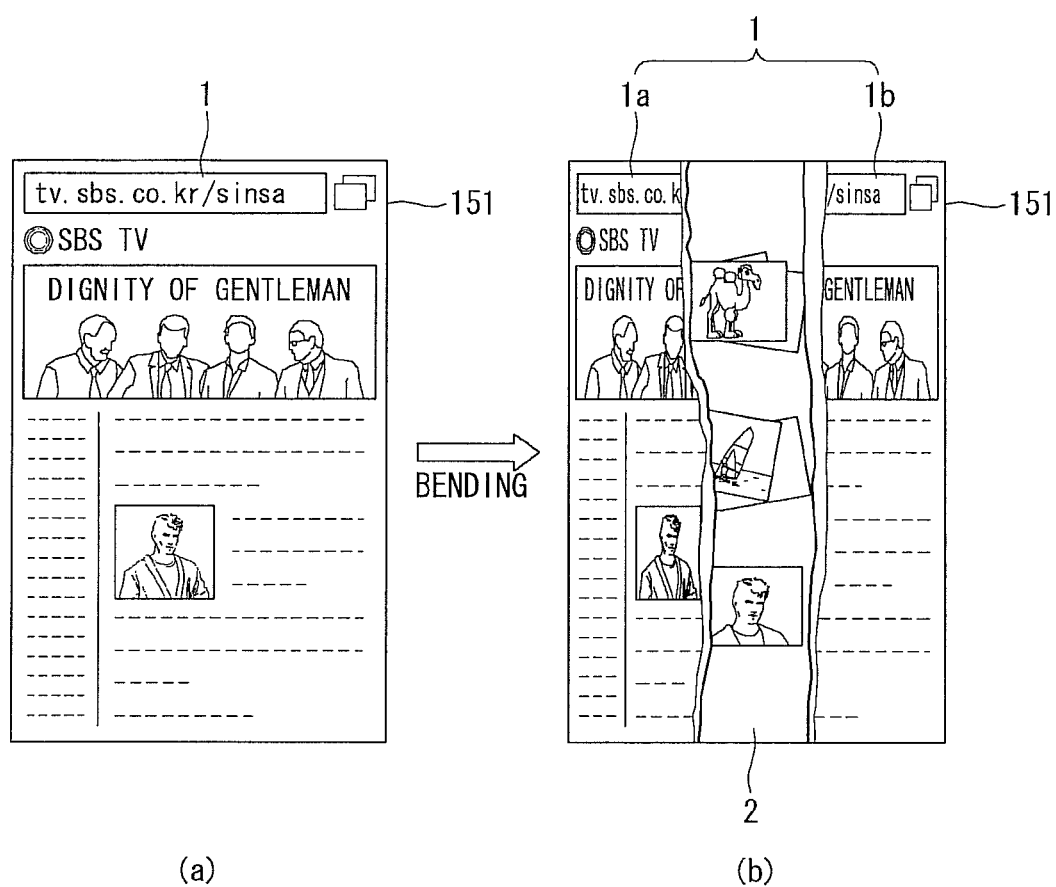
Figure 11:
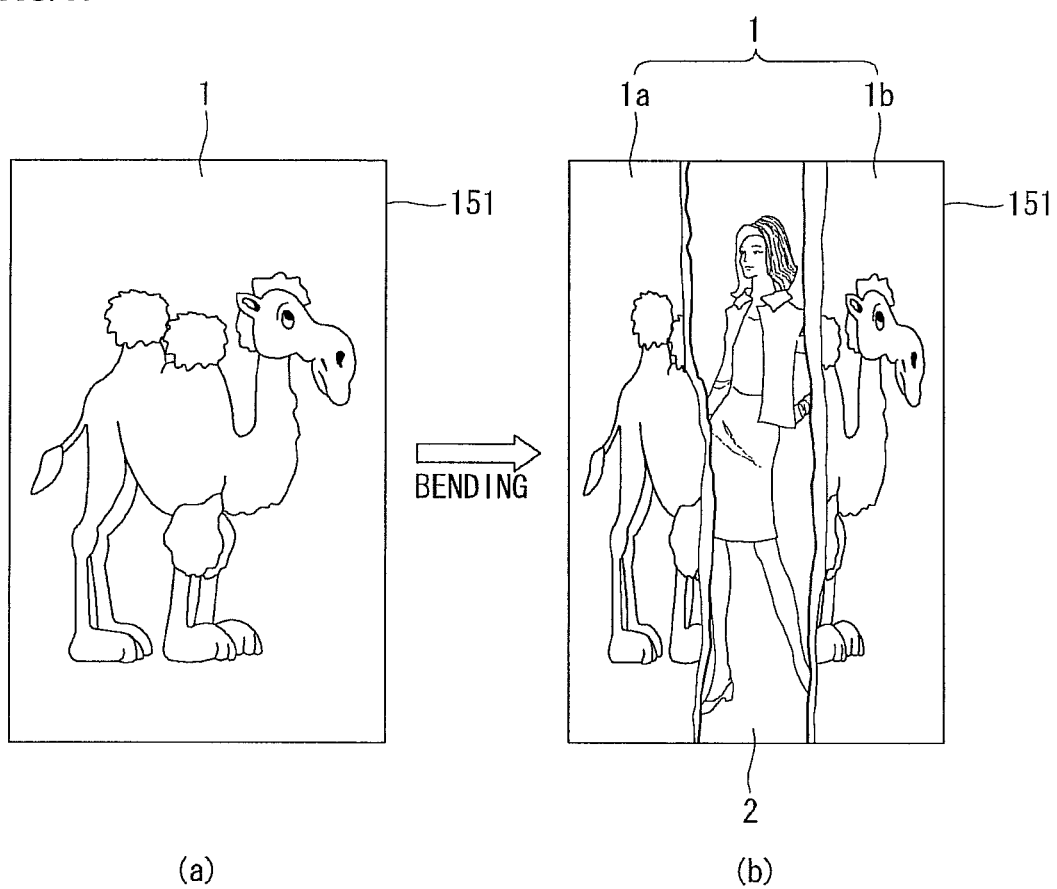

FIGS. 6A to 11B show examples of the second screen displayed according to the first screen. Referring to FIGS. 6A and 6B, as shown in FIG. 6A, when the bending of the flexible display 151 occurs in the state of displaying the lock screen 1, the controller 180 reads the home screen from the memory 160. Further, as shown in FIG. 6B, the lock screen 1 is divided into a plurality of regions 1a, 1b, and the divided regions 1a, 1b are scrolled in different direction from each other to display the home screen 2 between the divided regions 1a, 1b.

Referring to FIGS. 7A and 7B, as shown in FIG. 7A, when the bending of the flexible display 151 occurs in the state of displaying the home screen 2, the controller 180 reads a top menu screen related hierarchically to the home screen from the memory 160. Further, as shown in FIG. 7B, the controller 180 divides the lock screen 1 into a plurality of regions 1a, 1b, and scrolls the divided regions 1a, 1b in different direction from each other to display the top menu screen 2 between the divided regions 1a, 1b.

Referring to FIGS. 8A and 8B, as shown in FIG. 8A, when the bending of the flexible display 151 occurs in the state of displaying the lock screen 1, the controller 180 reads the screen being displayed just before entering a lock state, for example, a web page 2 from the memory 160. Further, as shown in FIG. 8B, the controller 180 divides the lock screen 1 into a plurality of regions 1a, 1b, and moves the divided regions 1a, 1b in different direction from each other to display the web page 2 between the divided regions 1a, 1b.

Referring to FIGS. 9A and 9B, as shown in FIG. 9A, when the bending of the flexible display 151 occurs in the state of displaying a first web page 1, the controller 180 reads a second web page displayed on the screen just before the first web page from the memory 160. Further, as shown in FIG. 9B, the controller 180 divides the first web page 1 being displayed into a plurality of regions 1a, 1b, and moves the divided regions 1a, 1b in different direction each other to display the second web page 2 between the divided regions 1a, 1b of the first web page 1.

Referring to FIGS. 10A and 10B, as shown in FIG. 10A, when the bending of the flexible display 151 occurs in the state displaying a specific web page 1 by performing a web browser, the controller 180 reads a gallery screen being operated in a foreground on the multitasking currently from the memory 160. Further, as shown in FIG. 10B, the controller 180 divides the web page 1 being displayed, and moves the divided regions 1a, 1b in different direction from each other to display the gallery screen 2 between the divided regions 1a, 1b of the web page.

Referring to FIGS. 11A and 11B, as shown in FIG. 11A, when the bending of the flexible display 151 occurs in the state displaying a first image 1 after entering the gallery, the controller 180 reads a second image 2 corresponding to a previous or next order of a first image 1 from the memory 160. Further, as shown in FIG. 11B, the controller 180 divides the first image 1 being displayed into a plurality of regions 1a, 1b, and moves the divided regions 1a, 1b in different direction from each other to expose the second image 2 between the divided regions 1a, 1b of the first image 1.

On the other hand, referring to FIGS. 6A to 11B, the controller 180 reduces information displayed on the first screen 1 based on the size of the reduced display region on scrolling the divided regions 1a, 1b to minimize information loss due to movements of the divided regions 1a, 1b. However, this may not be the case in other embodiments.

In accordance with one embodiment, on scrolling the divided regions 1a, 1b, the controller 180 may scroll at least part of the information being displayed on the first screen 1 into the outside of the screen, thereby disappearing the information on the screen.

Further, on scrolling the divided regions 1a, 1b, the controller 180 may change a layout of the information displayed on the first screen 1 based on the size of the reduced display region. For example, the controller 180 may change the layout of the information displayed on the first screen 1 to change the display position of the image or to lengthen the scroll of the text without changing the size of the text.

Further, referring to FIGS. 6A to 11B described above, the first screen 1 is divided, and therefore graphic elements such as the image, the icon etc. displayed on the first screen 1 are divided. This may not be the case in other embodiments, however. In accordance with one embodiment, the controller 180 may be operated so that, to minimize information loss displayed on the first screen 1, the item positioned in the region dividing line may not be divided by the region dividing line by reducing the display size thereof or moving the display position.

According to another embodiment, when the bending region is moved, the controller 180 may re-set the reference line based on the moved bending region. Further, the controller 180 may re-divide the first screen based on the re-set reference line.

FIGS. 12A and 12B show an example of re-dividing the first screen when the bending region is moved, e.g., when the bending region is moved from the center of the screen to the left.

Referring to FIG. 12A, the controller 180 acquires a reference line 4a from the center region of the lock screen 1 when the center region of the lock screen 1 is bent. Further, the controller 180 divides the lock screen 1 into a plurality of region 1a, 1b based on the acquired reference line 4a. As shown in FIG. 12B, the controller 180 re-acquires the reference line 4' from the left region based on the bending region changed when the bending region is moved to the left. Further, the controller 180 re-divides the lock screen 1 into a plurality of region 1a', 1b' based on the re-acquired reference line 4a.

Figure 12:
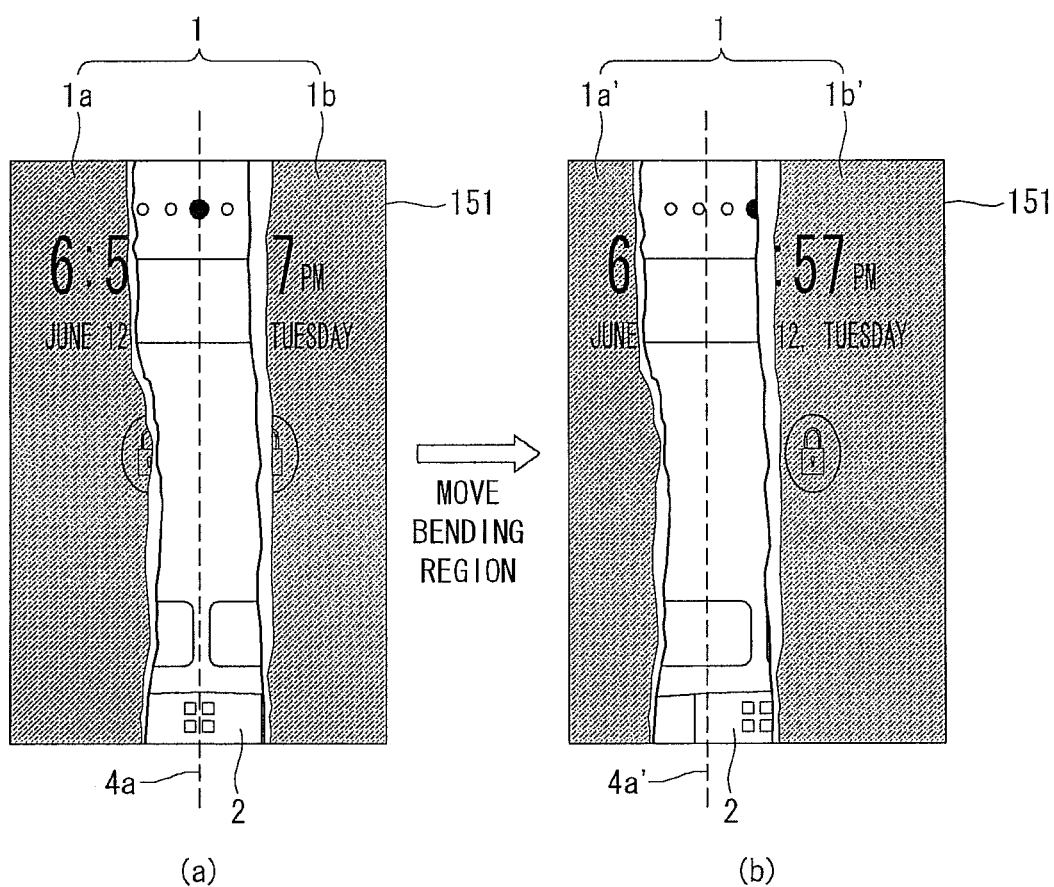
FIGS. 12A and 12B show an example of re-dividing the first screen when a flexible region moves in the mobile terminal.
Figure 13:
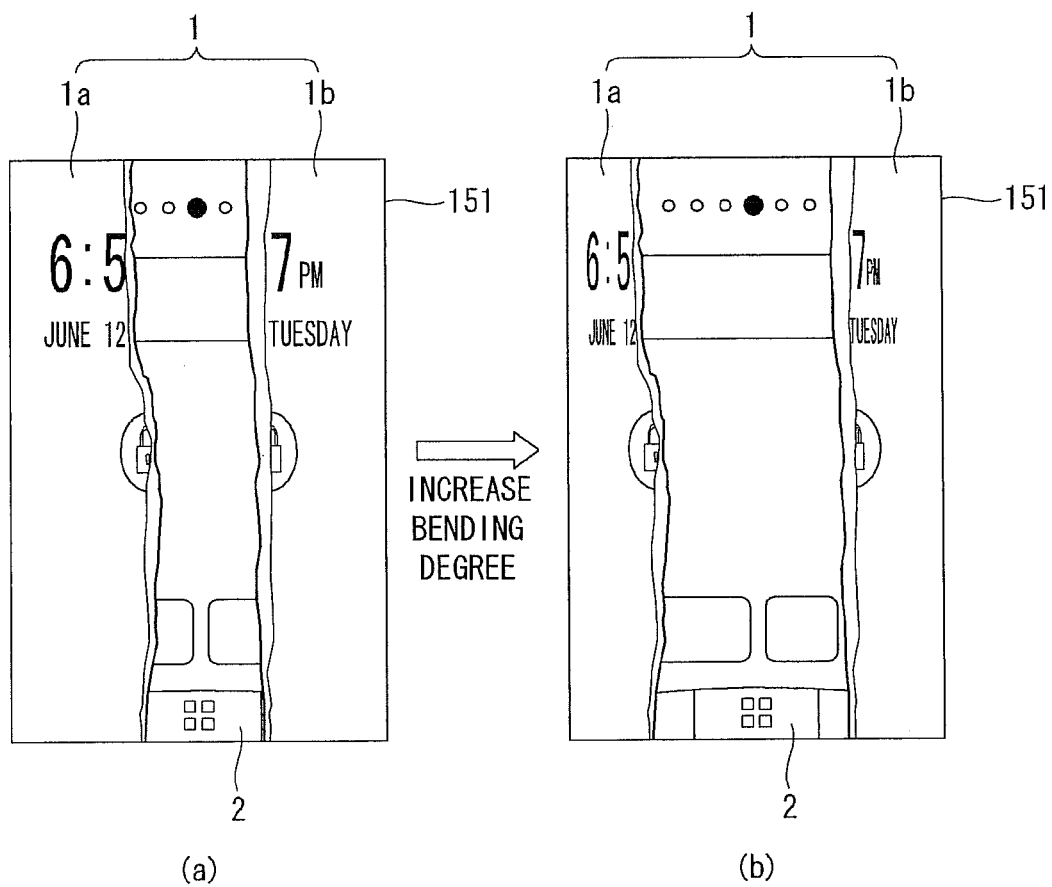
FIGS. 13A and 13B show an example of gradually moving a region to be divided according to a flexible degree in the mobile terminal.

According to one embodiment, the controller 180 may control a display characteristic of the first screen 1 or the second screen 2 to highlight the second screen 2 newly exposed between the divided regions 1a, 1b of the first screen 1 as compared with the divided regions 1a, 1b of the first screen 1. For example, the controller 180 allows the second screen 2 to be highlighted. Further, for example, as shown in FIG. 12, the controller 180 has the first screen 1 shaded or lowers brightness of the first screen 1 to predetermined lightness to relatively highlight the second screen 2 as compared with the first screen 1.

Referring back to FIG. 3, at step S104, when the first screen is divided into a plurality of regions, the controller 180 may automatically move each region apart by a predetermined distance. Further, the controller 180 may control the movement of the divided region based on the bending state. In the former case, the controller 180 moves the divided regions apart by the predetermined distance irrespective of the bending state. On the other hand, in the latter case, the controller 180 is operated so that the larger the bending degree, the divided regions are moved more, and the smaller the bending degree, the divided regions are moved less.

FIGS. 13A and 13B show an example of gradually moving the divided regions according to the bending degree, wherein the bending degree is gradually increased.

Referring to FIGS. 13A and 13B, when the bending of the flexible display 151 occurs, the controller 180 divides the lock screen 1 into a plurality of region 1*a*, 1*b* based on the bending region as shown in FIG. 13A. Further, the controller 180 moves the divided regions 1*a*, 1*b* of the lock screen by the predetermined distance. Then, when the bending degree is increased, the controller 180 controls the divided regions 1*a*, 1*b* to be spaced apart from each other as shown in FIG. 13B. Therefore, more items included in the home screen 2 may be displayed on the screen.

Figure 14:
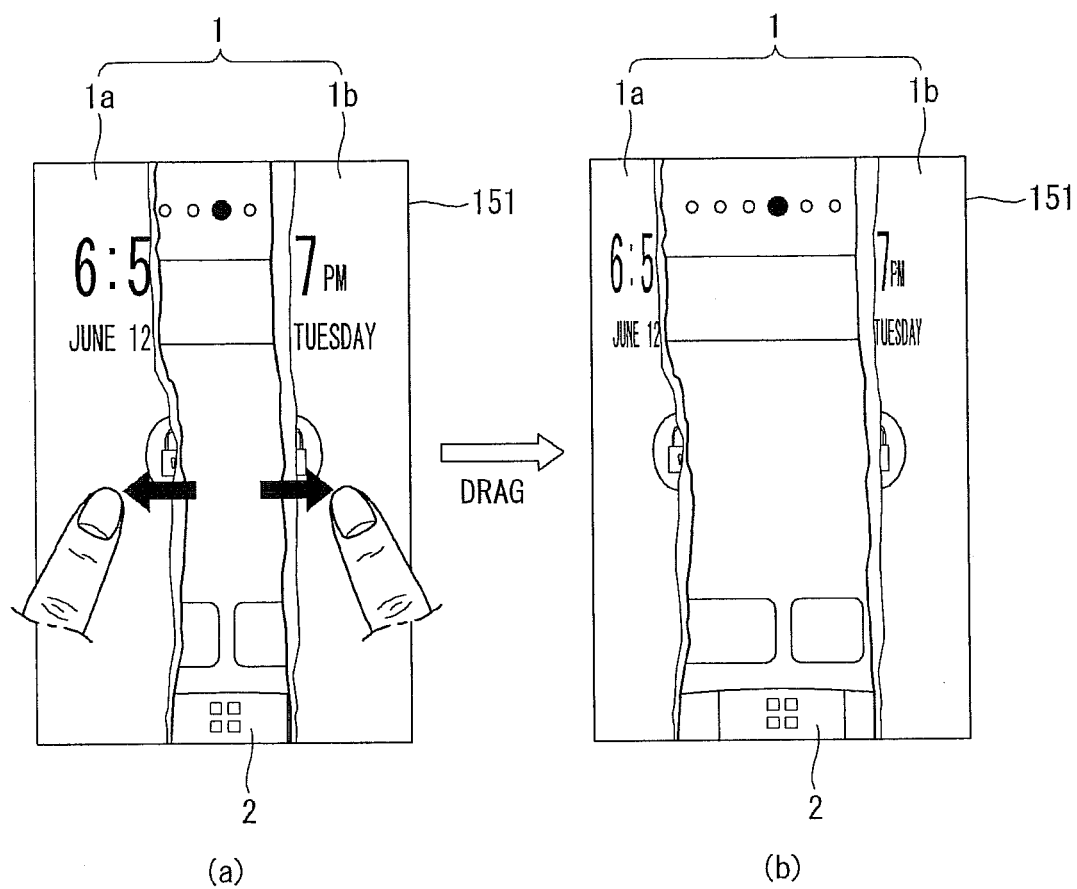
FIGS. 14A and 14B show an example of changing a region to be exposed between the divided regions of a second screen using a touch gesture in the mobile terminal.
Figure 15:
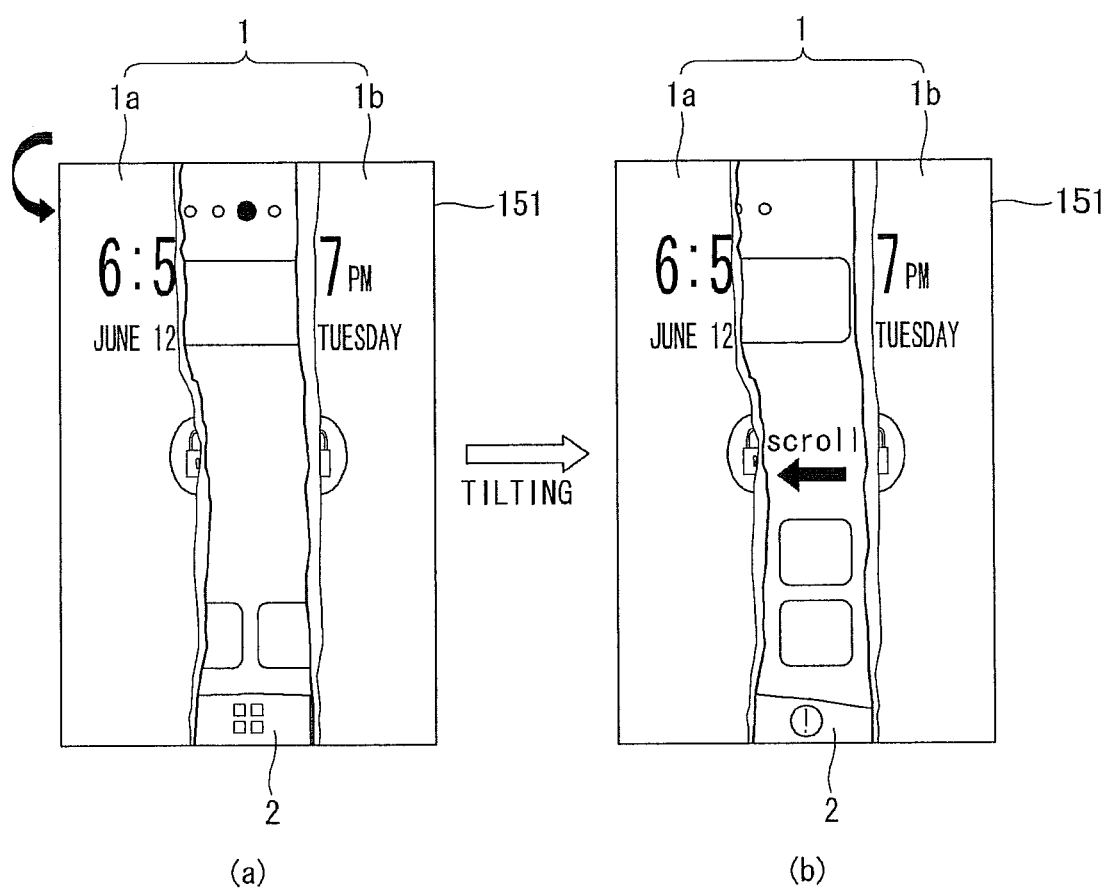
FIGS. 15A and 15B show an example of scrolling the second screen to be exposed between the divided regions using a motion of the mobile terminal.

On the other hand, according to one embodiment, the controller 180 moves the divided regions using the touch gesture for the divided regions. Further, the controller 180 scrolls the second screen displayed between the divided regions based on the motion of the mobile terminal 100. In the former case, the second screen moves the divided regions in a fixed state, and the region displayed on the screen of the second screen may be altered. On the other hand, in the latter case, the second screen scrolls the divided regions in a fixed state, and the region displayed on the screen of the second screen may be altered FIG. 14A to 15B show examples of changing the second screen to be exposed between the divided regions of the first screen, FIGS. 14A and 14B show examples of changing a region to be exposed between the divided regions of the second screen using the touch gesture, and FIGS. 15A and 15B show an example of scrolling the second screen to be exposed between the divided regions using the motion of the mobile terminal.

Referring to FIGS. 14A and 14B, the controller 180 divides the lock screen 1 into a plurality of a plurality of region 1*a*, 1*b* when the bending of the flexible display 151 occurs. Further, the controller 180 moves the divided regions by the predetermined distance. Then, the controller 180 is operated so that, as shown in FIG. 14A, the region divided by the user is touched and dragged, and therefore, as shown in FIG. 14B, the divided regions 1*a*, 1*b* are moved in a drag direction. Therefore, the region of the home screen 2 displayed on the screen is increased, and therefore, more items included in the home screen 2 may be displayed on the screen.

Referring to FIGS. 15A and 15B, the controller 180 divides the lock screen 1 into a plurality of regions 1*a*, 1*b* when the bending of the flexible display 151 occurs. Further, the controller 180 moves the divided regions by the predetermined distance. Then, the controller 180 is operated so that, as shown in FIG. 15A, the flexible display 151 is tilted, and therefore, as shown in FIG. 15B, the divided regions 1*a*, 1*b* are scrolled while corresponding the home screen 2 being displayed between the divided regions 1*a*, 1*b* in the fixed state to the tilting direction. Therefore, the region to be exposed on the screen of the home screen 2 is scrolled, and therefore, the item displayed on the screen of the items disposed on the home screen 2 is changed. On the other hand, as shown in FIG. 15B, the controller 180 fixes the divided regions 1*a*, 1*b* of the lock screen 1 even when the home screen 2 is scrolled.

As shown in FIG. 14A to 15B, the function of controlling the region displayed on the screen of the second screen by inputting the touch gesture by the user or tilting the mobile terminal 100 may be directly controlled by the user to display the region, the user wants, of the second screen on the screen, such that the user's convenience is improved.

Referring back to FIG. 3, at the step S104, when the bending degree becomes above the predetermined value, the controller 180 divides the second screen, and moves the divided regions of the second screen to newly display a third screen between the divided regions of the second screen. Here, the third screen may be the screen related hierarchically to the second screen and may be the screen disposed back and forth to the second screen.

FIGS. 16A and 16B show an example of displaying a third region on the screen. Referring to FIGS. 16A and 16B, the controller 180 divides the lock screen 1 into a plurality of regions 1*a*, 1*b* when the bending of the flexible display 151 occurs in the state of displaying the lock screen 1.

Further, as shown in FIG. 16A, the controller 180 moves the divided regions by the predetermined distance to expose the home screen 2 between the divided regions 1*a*, 1*b*. Then, when the bending degree is increased above the predetermined value, as shown in FIG. 16B, the controller 180 divides the home screen 2 into a plurality of regions 2*a*, 2*b*. Further, to display a top menu screen 3 between the divided regions 2*a*, 2*b* of the home screen, the controller 180 moves the divided regions 2*a*, 2*b* of the home screen.

Referring back to FIG. 3, at the step S105, the controller 180 persistently acquires the bending degree or the bending velocity of the flexible display 151 by the sensing unit 140. Further, after comparing the acquired bending degree or bending velocity with the predetermined values, when the bending degree becomes above the predetermined value or the bending velocity becomes above the predetermined value, it is determined that the bending state satisfies the conditions for entering the second screen.

When the bending degree becomes above the predetermined value, FIGS. 17A and 17B show an example of entering the second screen. Referring to FIGS. 17A and 17B, as shown in FIG. 17A, the controller 180 divides the lock screen 1 into a plurality of regions 1*a*, 1*b* when the bending of the flexible display 151 occurs in the state of displaying the lock screen 1. Further, the controller 180 displays the home screen 2 by moving the divided regions 1*a*, 1*b*.

Then, when the bending degree of the flexible display 151 is increased and therefore it is bent above the predetermined value, the controller 180 releases the lock state and allows the home screen 2 to be directly entered. That is, the controller 180 displays the home screen 2 rather than the lock screen 1 on the flexible display 151.

On the other hand, according to the one embodiment, when the bending velocity becomes above the predetermined value, the controller 180 allows the second screen to be directly entered by omitting the step S103 and S104. That is, when the bending velocity becomes above the predetermined velocity, it is possible to directly change from the first screen to the second screen. When the bending generated in the step S102 is generated by bending a plurality of regions of the flexible display 151 in opposite direction from each other, the controller 180 removes the first screen from the screen and allows the second screen to be directly entered.

Further, in accordance with one embodiment, when the bending state of the flexible display 151 satisfies the predetermined conditions, the case for entering the second screen, for example, is described. When the divided regions of the first screen move above the predetermined distance and the second screen is displayed above the predetermined region, the controller 180 allows the second screen to be entered. Further, when a separate control input such as a touch input or a motion input of the mobile terminal 100 is received, the controller 180 allows the second screen to be entered. For example, when the second screen is touched or a body of the mobile terminal 100 is tapped or tilted, the controller 180 allows the second screen to be entered.

Figure 18:
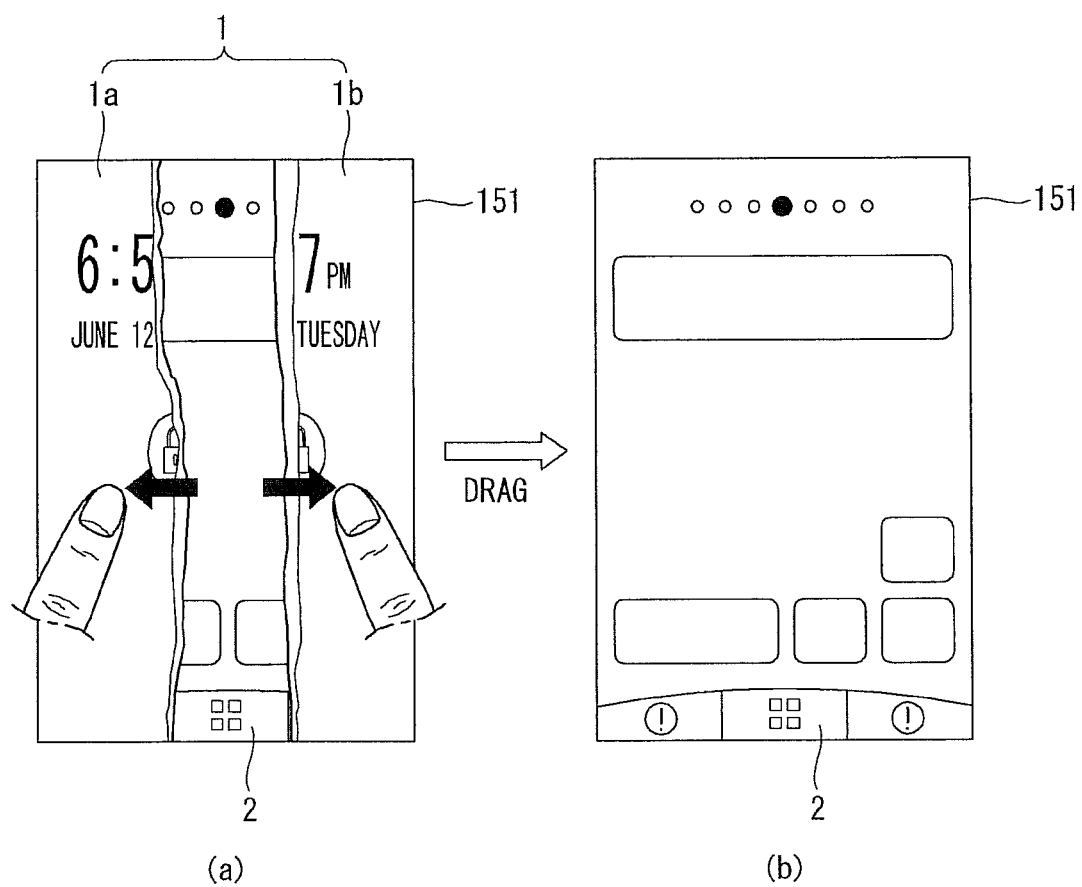
Figure 19:
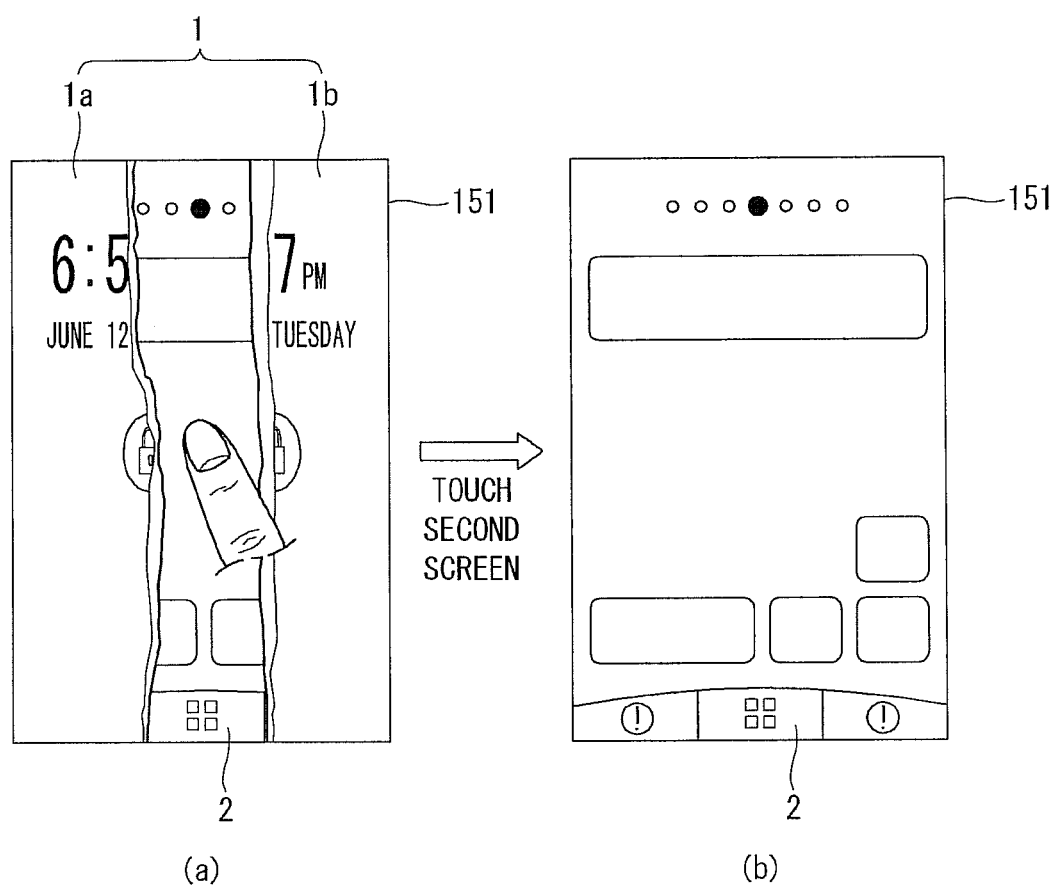

FIGS. 18A to 19B show examples for entering the second screen using the touch gesture. Referring to 18A and 18B, when the bending of the flexible display 151 is generated, the controller 180 is operated in the state for displaying the home screen 2 between the divided region 1a, 1b of the lock screen 1 so that, as shown in FIG. 18A, the divided regions 1a, 1b of the lock screen 1 receive the touch gesture to be touched and dragged. Therefore, the controller 180 moves the divided regions 1a, 1b based on a drag direction. Further, when the divided regions 1a, 1b are moved above the predetermined distance by the touch input or the divided regions 1a, 1b are spaced apart from each other above the predetermined distance, the controller 180 releases the lock state and allows the home screen 2 to be entered as shown in FIG. 18B.

Referring to 19A and 19B, when the bending of the flexible display 151 is generated, the controller 180 is operated in the state of displaying the home screen 2 between the divided regions 1a, 1b of the lock screen 1 so that, as shown in FIG. 19A, the controller 180 receives the touch input for the home screen 2. Therefore, as shown in FIG. 19B, the controller 180 releases the lock state and allows the home screen 2 to be directly entered.

Referring back to FIG. 3, at the step S107 and S108, when the flexible display 151 is restored into the unfolding state, the controller 180, for example, restores the current screen into the state before the bending is generated. In accordance with one embodiment, the controller 180 may maintain a current screen without changing even when the flexible display 151 is restored in the unfolding state. That is, the controller 180 may maintain the screen in the state of exposing the second screen between the divided regions 1a, 1b of the first screen.

Further, the controller 180 is operated in the state of bending the flexible display 151 so that, on receiving the specific control input, the controller 180 may maintain the current screen without changing even when the flexible display 151 is restored into the unfolding state. For example, when the specific icon corresponded with the screen fixing function is touched or the specific button is operated or the specific touch gesture is inputted in the state of bending the flexible display 151, the controller 180 may maintain the current screen without changing.

Figure 20:
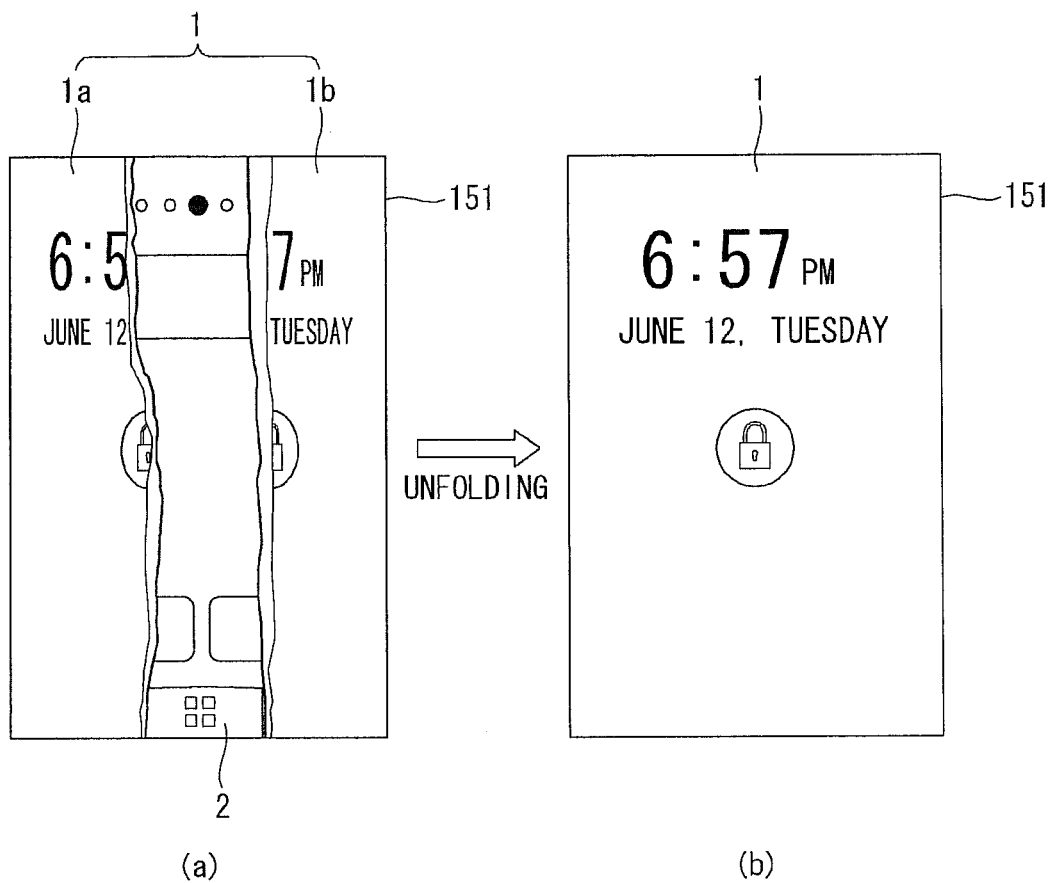
Figure 21:
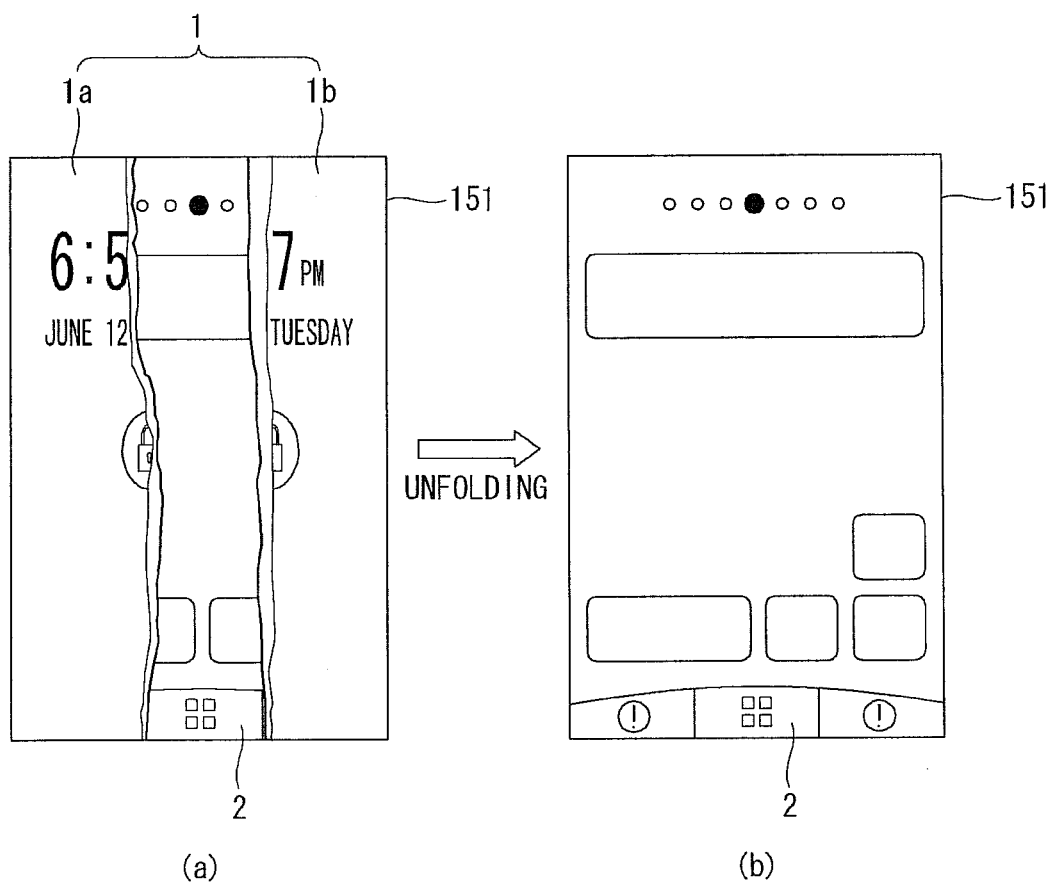

FIGS. 20A to 21B show examples of the screen displayed on restoring the flexible display in the unfolding state. Referring to FIGS. 20A and 20B, when the flexible display 151 is altered in the bent state, the controller 180 displays the home screen 2 between the divided regions 1a, 1b of the lock screen 1 as shown in FIG. 20A. Then, when the flexible display 151 is restored into the unfolding state, the controller 180 restores the screen into the display state of the lock screen 1 prior to the generation of the bending. That is, the controller 180 displays one lock screen that combines the divided regions of the lock screen 1 on the flexible display 151.

Referring to FIGS. 21A and 21B, when the flexible display 151 is altered in the bent state, the controller 180 displays the home screen 2 between the divided regions 1a, 1b of the lock screen 1 as shown in FIG. 21A. Then, when the flexible display 151 is restored into the unfolding state, the controller 180 releases the lock state and allows the home screen 2 to be directly entered.

Figure 22:
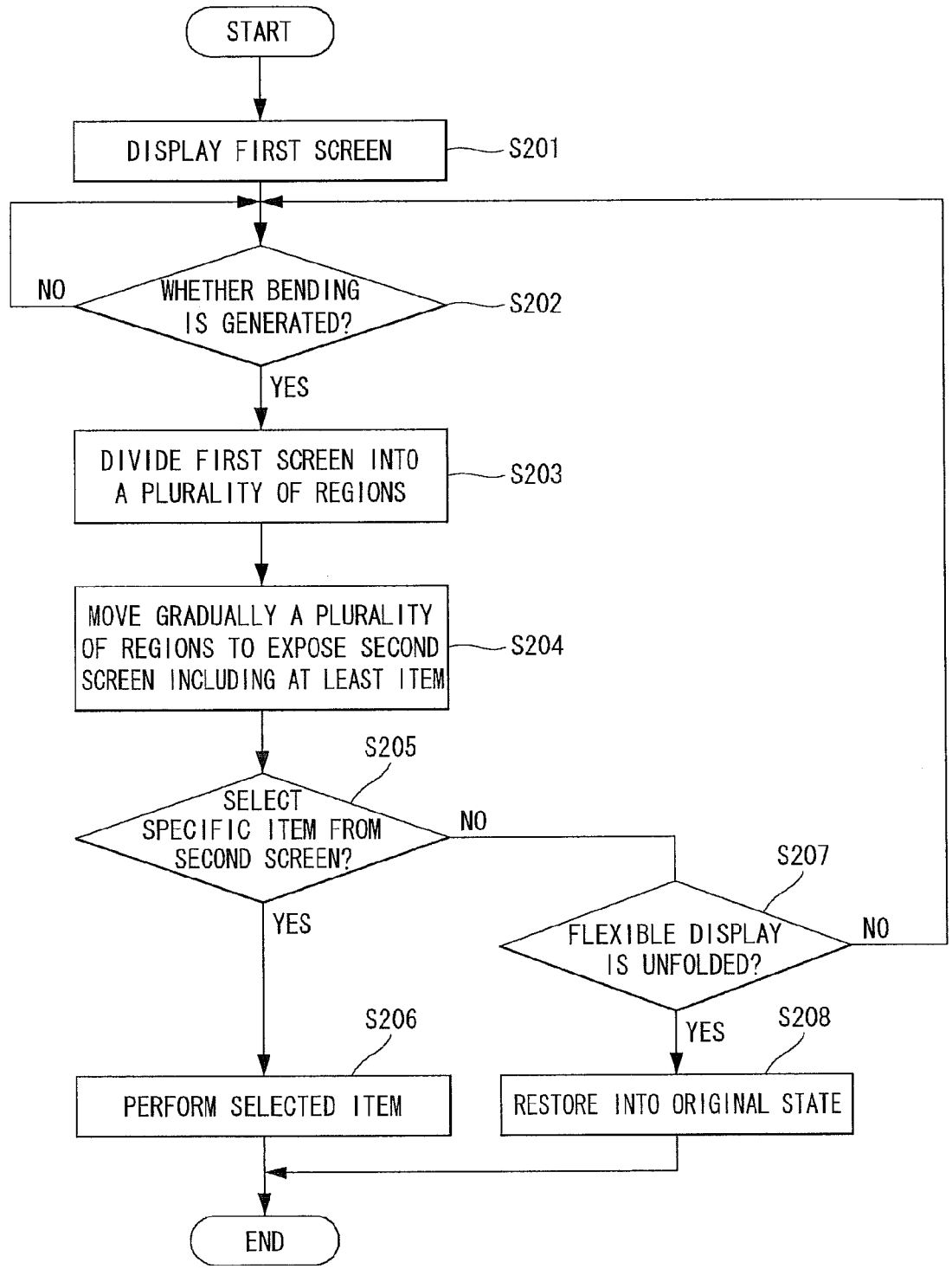
FIG. 22 shows another embodiment of a method of controlling a terminal.

FIG. 22 shows additional embodiments of methods of controlling a mobile terminal, and FIGS. 23 to 27 explain the method shown in FIG. 22. Because steps S201 to S203 shown in FIG. 22 are similarly performed with the steps S101 to S303 shown in FIG. 3 described above and the steps S207 and S208 shown in FIG. 22 are similarly performed with the steps S107 and S108 shown in FIG. 3 described above, the detailed description for the similar content is omitted hereinafter. Further, since the method of moving the divided regions of the first screen at the step S204 shown in FIG. 22 is similarly performed with the method of moving the divided regions of the first screen at the step S104 shown in FIG. 3 described above, the detailed description for the similar content is omitted hereinafter.

Referring to FIG. 22, the controller 180 displays the first screen on the flexible display 151 (S201). The controller 180 may determine whether the bending of the flexible display 151 occurs, based on output signals of the bend sensing unit included in the sensing unit 140 (S202).

When the generation of the bending is sensed, the controller 180 divides the first screen into a plurality of regions (S203). Further, the controller 180 gradually moves a plurality of divided regions to expose at least part of the second screen between a plurality of divided regions (S204). Here, the second screen includes at least one selectable item.

When the touch inputs for selecting the specific item of item included in the second screen are received (S205), the controller 180 performs the selected item. Further, the controller 180 displays the performance screen for the selected item rather than the first screen on the flexible display 151 (S206).

On the other hand, when the flexible display 151 is changed in the unfolding state (S207), the controller 180 restores the screen into the state, before the flexible display 151 is bent, based on the output signal of the bend sensing unit included in the sensing unit 140 (S208).

At step S204, the second screen may be implemented with various embodiments according to the first screen. The second screen may include at least one application list that is currently performed or registered as a bookmark by the user. Further, the second screen is performed on the multitasking or may include most frequently used one application list. Further, when the first screen is an electronic book screen, the second screen may include the list configured with the page set as the leaves of a book or the page registered as the bookmark by the user. Further, when the first screen is the web page, the second screen may include the list configured with the web page registered as the bookmark or the web page being opened by the user.

Figure 23:
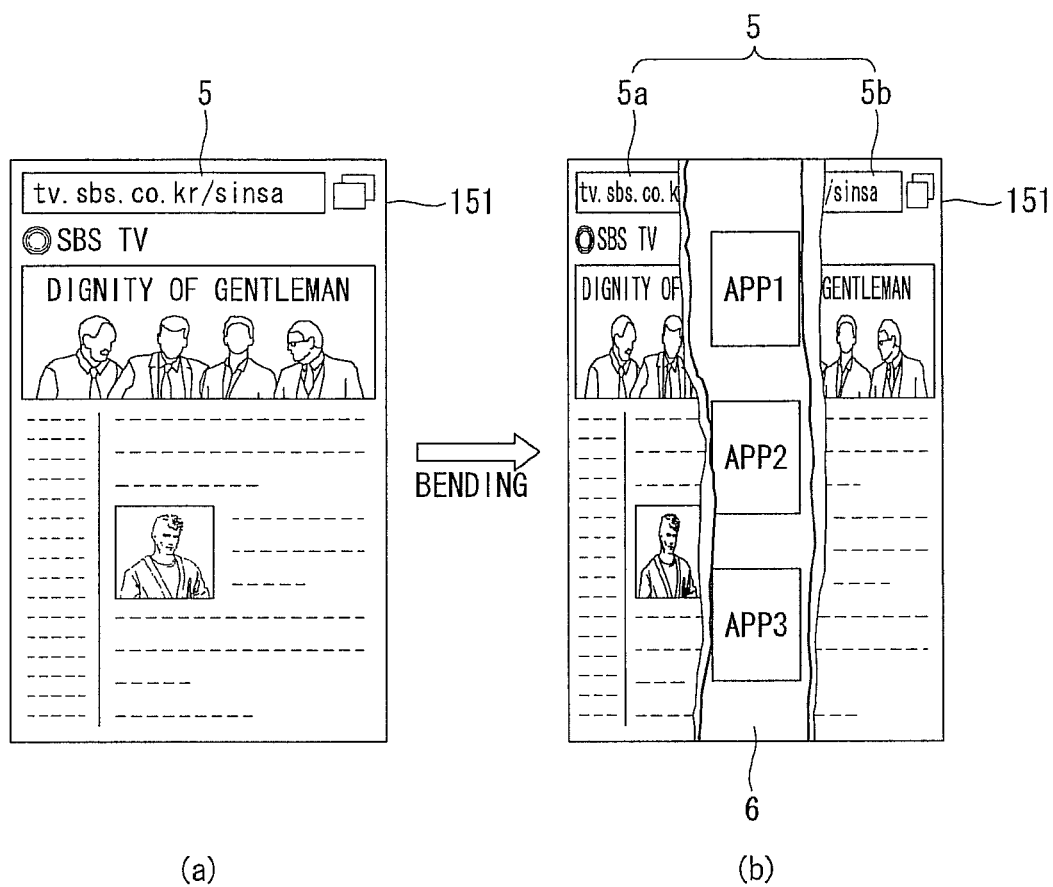
Figure 24:
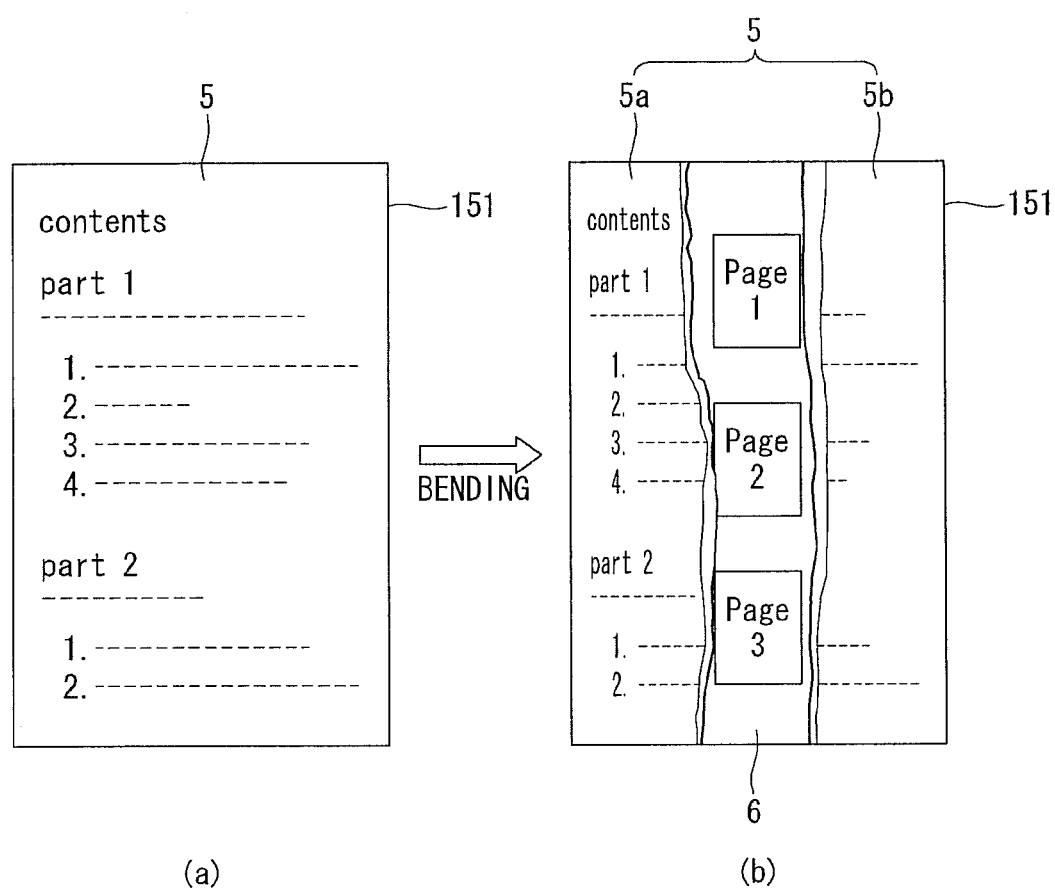
Figure 25:
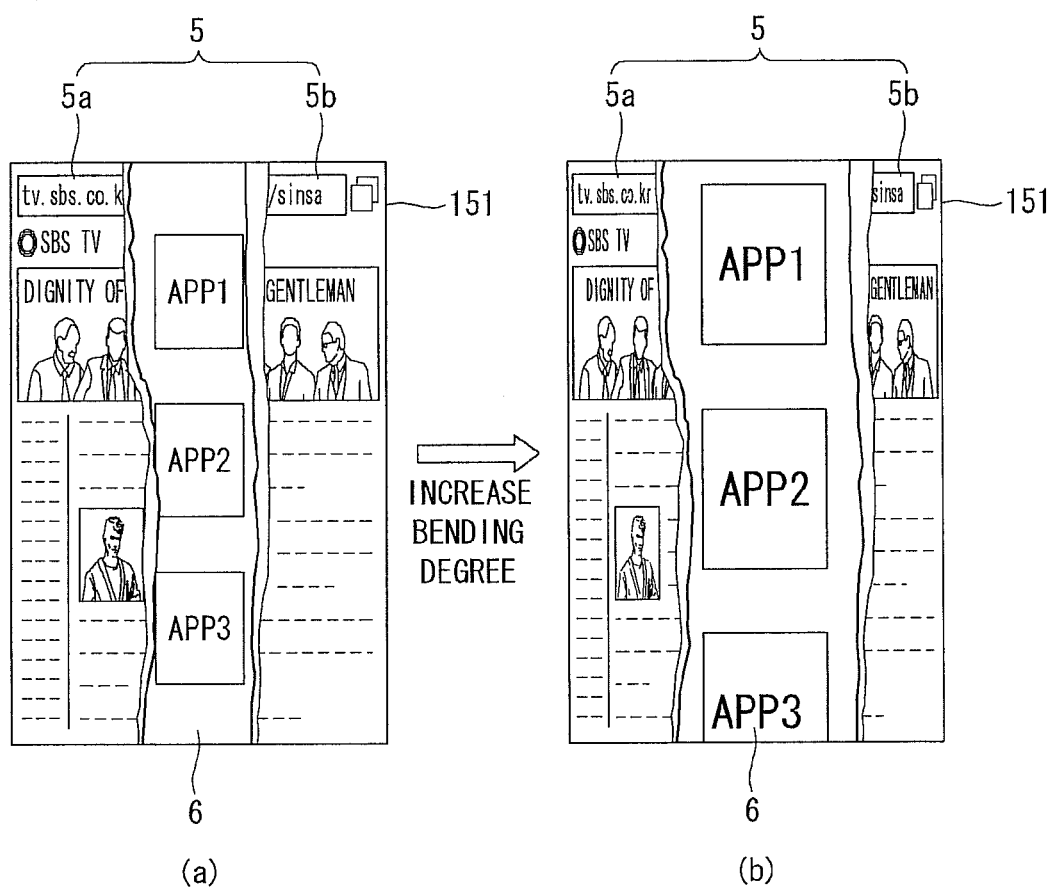
FIGS. 25A and 25B show an example of changing the size of items to be displayed according to the size of a second screen to be displayed in the mobile terminal.

When the bending is generated at the step S204, FIGS. 23A to 24B show examples of displaying the second screen. Referring to FIGS. 23A and 23B, the controller 180 is operated in the state of displaying a web page 5 by the web browser as shown in FIG. 23A so that the web page 5 being displayed is divided into a plurality of regions 5a, 5b when the bending of the flexible display 151 is generated.

In addition, as shown in FIG. 23B, the controller 180 moves the divided regions 5a, 5b to expose a newly screen 6 between the divided regions 5a, 5b of the web page 5. Further, the controller 180 displays the list configured with applications APP1 to APP3 on the multitasking together with a current browser on the newly exposed screen 22. Here, each application is displayed using thumbnails corresponding to each application, and the thumbnail of each application may use the performance screen for each application as a reduced image.

Referring to FIGS. 24A and 24B, the controller 180 is operated in the state of displaying the specific page 5 of the electronic book as shown in FIG. 24A so that the page 5 being displayed is divided into a plurality of regions 5a, 5b when the bending of the flexible display 151 is generated. In addition, as shown in FIG. 24B, the controller 180 moves the divided regions 5a, 5b to expose the newly screen 6 between the divided regions 5a, 5b. Further, the controller 180 displays the list configured with the pages Page1 to Page3 set as the leaves of a book on the newly exposed screen 6. Here, the list configured with the pages set as the leaves of a book is displayed using the thumbnail corresponding to each page, and the thumbnail of each page may use a preview screen of each page as the reduced image.

Referring back to FIG. 22, when the first screen is divided into a plurality of regions at the step S204, the controller 180 automatically moves each regions by the predetermined distance irrespective of the bending state or may control the movement of the divided regions based on the bending state. Further, when the bending is moved, the controller 180 re-sets the reference line based on the moved bending region. Further, the controller 180 re-divides the first screen based on the re-set reference line.

On the other hand, the controller 180 may control the size of the item displayed on the second screen based on the size of the second screen to be exposed on the screen when the divided regions of the first screen are moved.

FIGS. 25A and 25B show an example of changing the size of items to be displayed according to the size of displaying the second screen. Referring to FIGS. 25A and 25B, as shown in FIG. 25A, the controller 180 displays the new screen 6 between the divided regions 5a, 5b of the web page 5 when the bending of the flexible display 151 is generated, and displays the list configured with the applications APP1 to APP3 on the multitasking together with the current web browser on the newly displayed screen 6.

Then, when the bending of the flexible display 151 is increased, the controller 180 gradually spaces the divided regions 5a, 5b of the web page 5 as shown in FIG. 25B. Further, when the size of the regions displayed between the divided regions 5a, 5b spaced apart from each other is increased, the divided regions 5a, 5b magnify the thumbnails of each applications APP1 to APP3.

On the other hand, according to one embodiment, the controller 180 may control a display characteristic of the first screen 5 or the second screen 6 to highlight the second screen 6 newly exposed between the divided regions 5a, 5b of the first screen 5 as compared with the divided regions 5a, 5b of the first screen 5.

Further, according to one embodiment, when it is impossible to display all item list on the second screen 6 by lengthening the scroll of the item list displayed on the second screen 6, the controller 180 may scroll the item list based on the touch gesture inputted to the second screen 6 or the motion of the mobile terminal 100 as shown in FIG. 25B. For example, when the second screen 6 is flicked or dragged, the controller 180 may scroll the item list displayed on the second screen 6 in the flicking or dragging direction. Further, for example, when the mobile terminal 100 is tilted in the specific direction, the controller 180 may scroll the item list displayed on the second screen 6 in the tilting direction.

Referring back to FIG. 22, at the step S204, the controller 180, as shown in FIGS. 23A and 24B described above, reduces information displayed on the first screen 5 based on the size of display region to be reduced on scrolling the divided regions 5a, 5b to minimize information loss due to the movement of the divided regions 5a, 5b.

In accordance with one embodiment, on scrolling the divided regions 5a, 5b, the controller 180 scrolls at least part of the information being displayed on the first screen 1 into the outside of the screen, thereby disappearing the information on the screen. Further, on scrolling the divided regions 5a, 5b, the controller 180 may change a layout of the information displayed on the first screen 5 based on the size of the reduced display region. For example, the controller 180 may change the layout of the information displayed on the first screen 1 to change the display position of the image or to lengthen the scroll of the text with without changing the size of the text.

Further, at the step S204, the controller 180 moves the divided regions using the touch gesture for the divided regions as shown in FIGS. 14A and 14B described above. Further, the controller 180 may scroll the second screen displayed between the divided regions based on the motion of the mobile terminal 100 as shown in FIGS. 15A and 15B described above.

Figure 26:
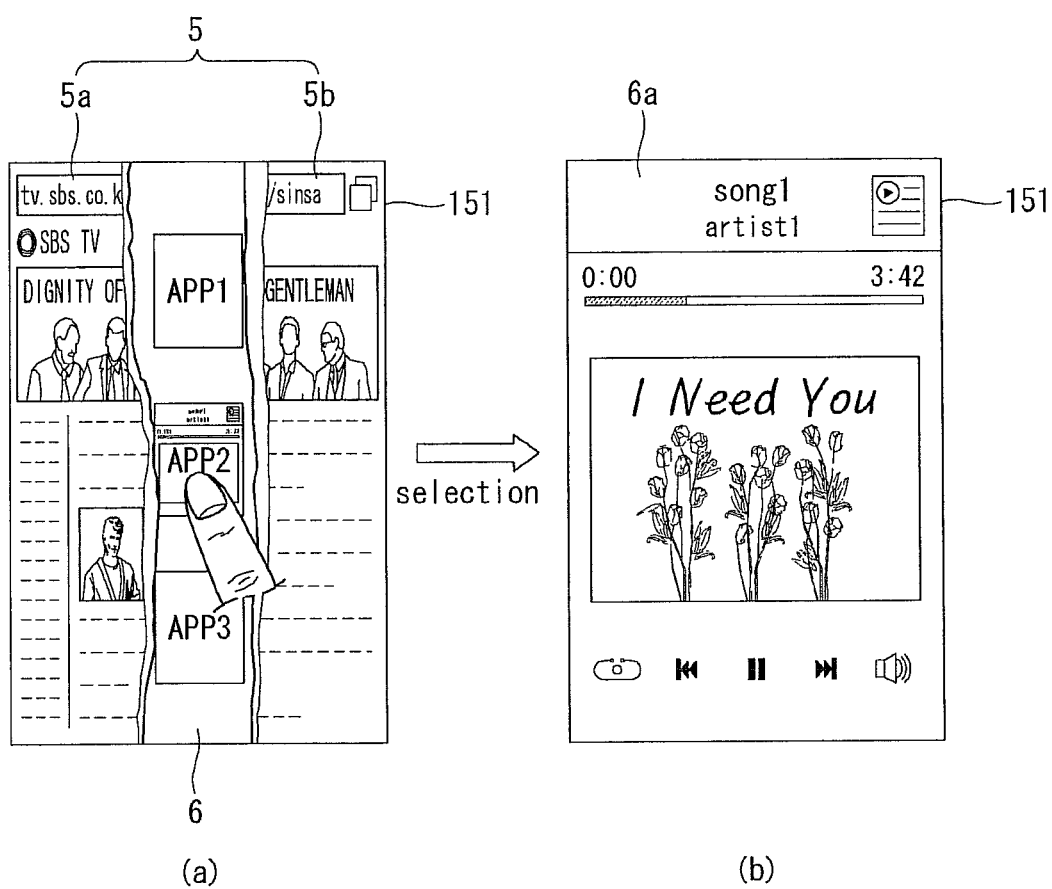
Figure 27:
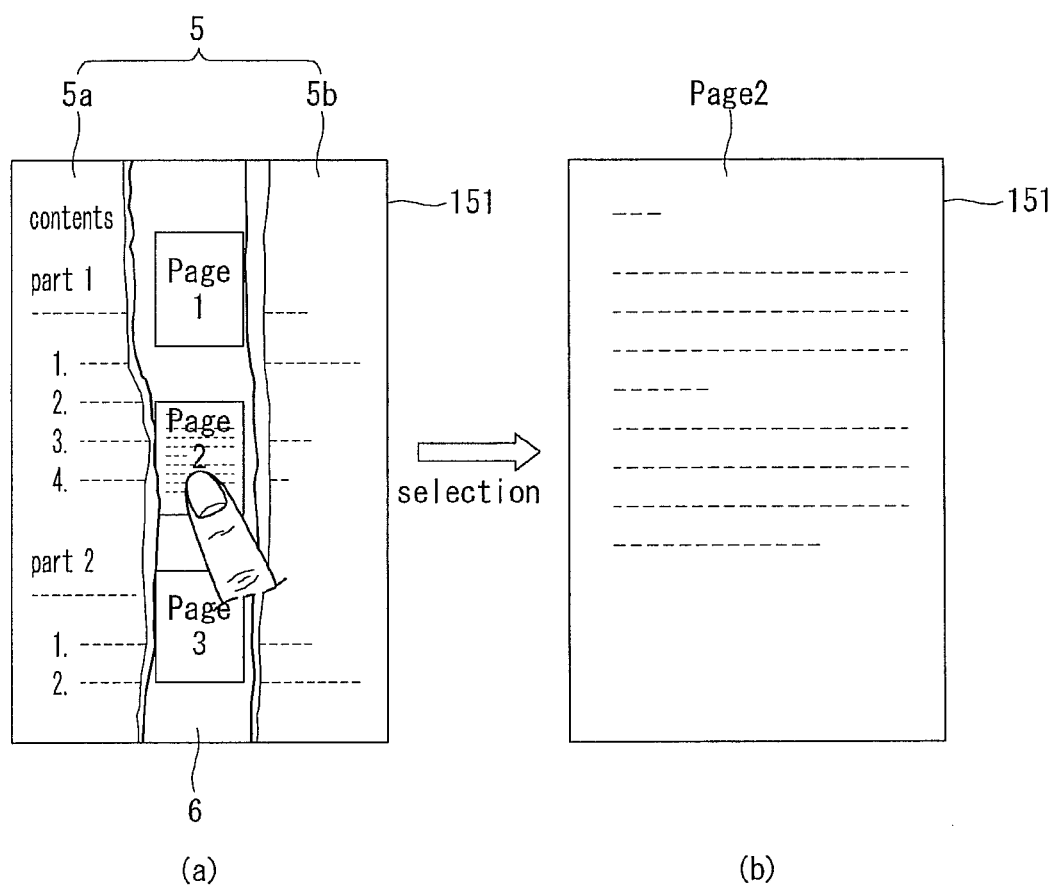

FIGS. 26A to 27B show examples of performing by touching the item included in the second screen at the step S205 and S206. Referring to FIGS. 26A and 26B, when the bending of the flexible display 151 is generated, the controller 180 displays the list configured with the applications APP1 to APP3 on the multitasking as shown in FIG. 26B. Further, when any one application of the list, that is, a music reproducing application APP2 is selected by the touch gesture, the controller 180 allows the music reproducing application APP2 to be entered as shown in FIG. 26B. That is, the controller 180 performs the music reproducing application APP2 performed in the background in the foreground, and displays the performance screen 6a for the music reproducing application on the flexible display.

Referring to FIGS. 27A and 27B, when the bending of the flexible display 151 is generated, the controller 180 displays the list configured with the pages Page1 to Page3 set as the leaves of a book as shown in FIG. 27A. Further, when any one page of the page list is selected by the touch gesture, the controller reads the selected page Page2 from the memory 160 and displays the read page on the flexible display 151 as shown in FIG. 27B.

Referring back to FIG. 22, at the step S207 and S208, when the flexible display 151 is restored into the unfolding state, the controller 180, for example, restores the current screen into the state before the bending is generated. In accordance with one embodiment, the controller 180 may maintain the current screen without changing even when the flexible display 151 is restored in the unfolding state. That is, the controller 180 may maintain the screen in the state of exposing the second screen between the divided regions 1a, 1b the first screen.

Further, the controller 180 is operated in the state of bending the flexible display 151 so that, on receiving the specific control inputs, the controller 180 may maintain the current screen without changing even when the flexible display 151 is restored into the unfolding state. For example, when the specific icon corresponded with the screen fixing function is touched or the specific button is operated or the specific touch gesture is inputted in the state of bending the flexible display 151, the controller 180 may maintain the current screen without changing.

On the other hand, in FIG. 22, the case of performing the item included in the second screen by the touch input, for example, is described. In accordance with one embodiment, when the flexible display 151 is bent once more in the state of displaying the second screen, the controller 180 may select the item based on the bent region. For example, when the flexible display 151 is bent in the direction vertical to the direction of displaying the item list or a current bent direction, the controller 180 may select the item disposed in the bent region.

Figure 28:
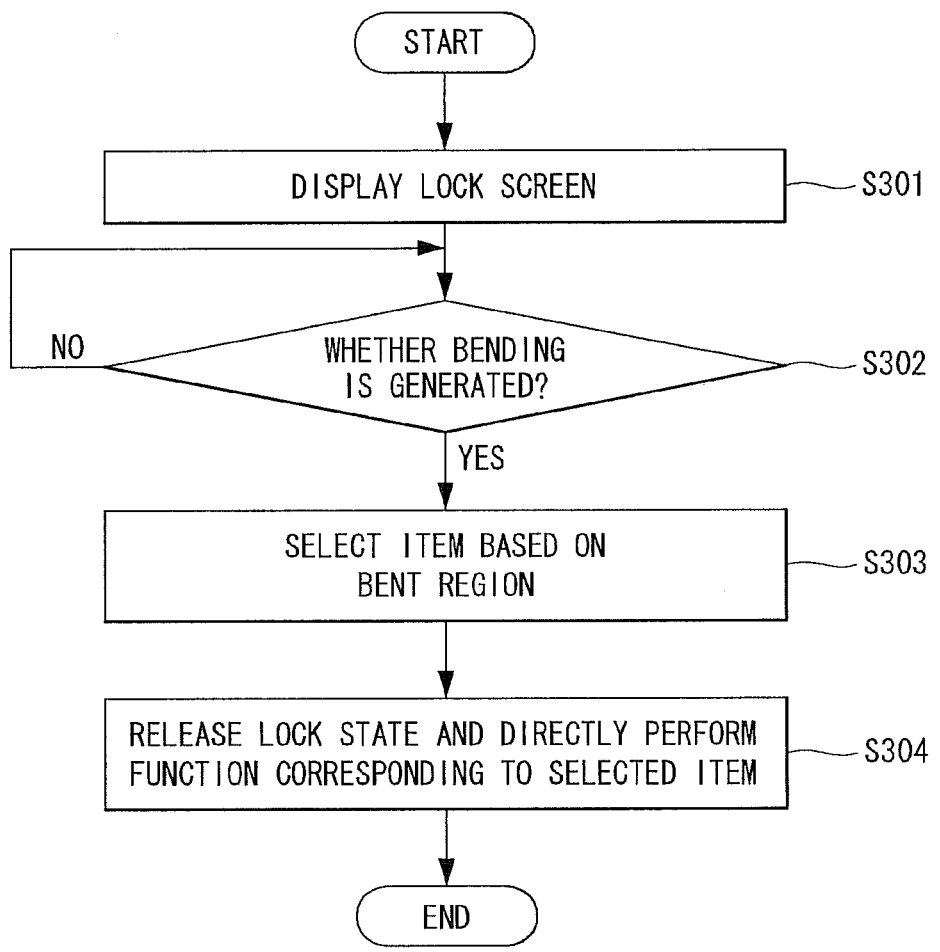
FIG. 28 shows other embodiments of methods of controlling a terminal.
Figure 29:
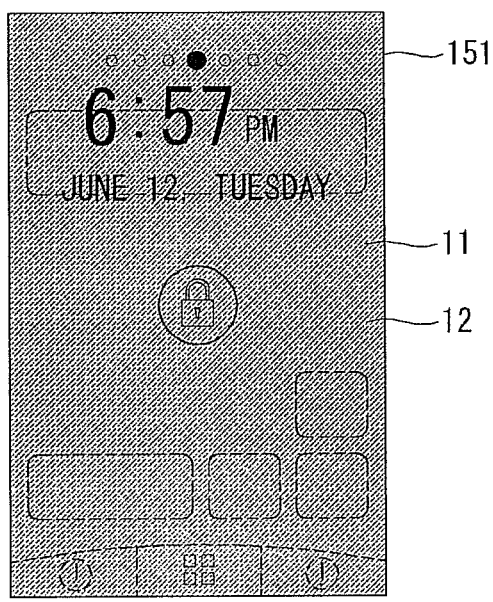
FIG. 29 shows an example of exposing a home screen below a lock screen by transparently controlling the lock screen in a mobile terminal.
Figure 30:
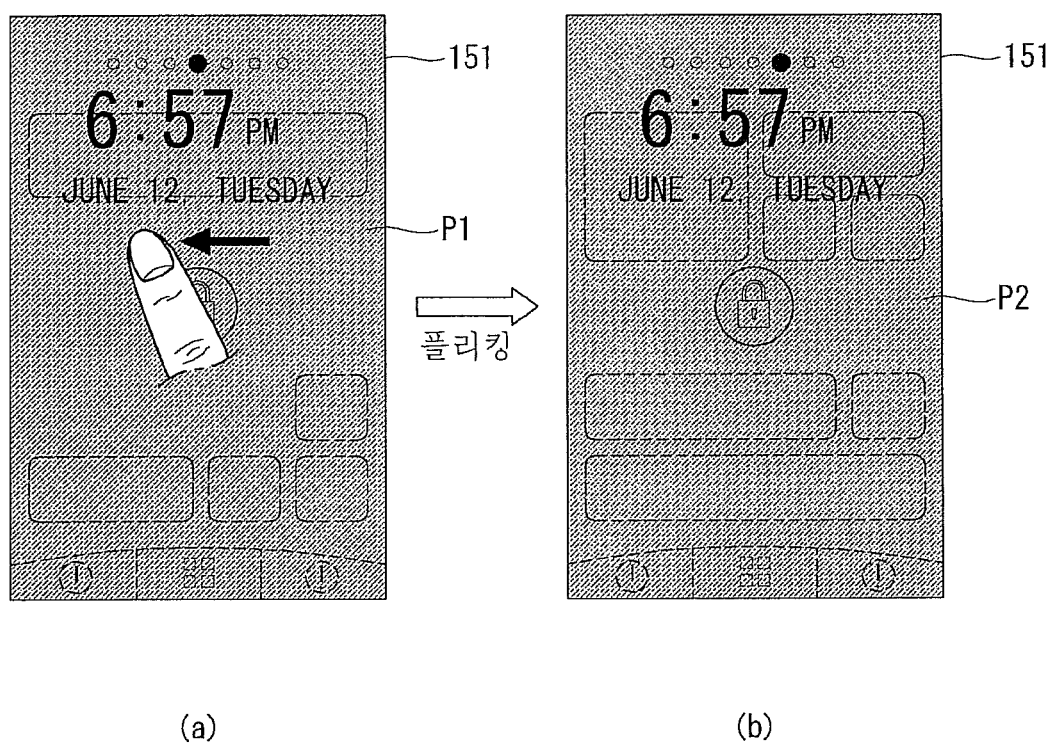
FIGS. 30A and 30B show an example of scrolling a page of a home screen in a state of displaying the lock screen in the mobile terminal.

FIG. 28 shows embodiments of methods of controlling a mobile terminal, and FIGS. 29 to 33B explain the methods shown in FIGS. 30A and 30B. Referring to FIG. 28, the controller 180 displays the lock screen on the flexible display 151 (S301).

The controller 180 may determine whether the bending of the flexible display 151 occurs, based on the output signals of the bend sensing unit included in the sensing unit 140 (S302).

When the generation of the bending is sensed, the controller 180 acquires the bending region by the bend sensing unit 180, and selects the item based on the bending region (S303). Further, the controller 180 releases the lock state and directly performs the function corresponding to the selected item (S304). Further, the controller 180 displays a function performance screen on the screen. Here, the item may include a shortcut icon, a widget etc.

In step S301, the controller 180 may display the lock screen in a semitransparent state to display the home screen disposed with the item, thereby to improve the convenience of selecting the item for the user.

FIG. 29 shows an example of exposing the home screen below the lock screen by transparently controlling the locking screen. Referring to FIG. 29, the controller 180 controls the lock screen 11 in the semitransparent state so that at least one item disposed in the home screen 12 may be displayed below the lock screen 11. Therefore, the user checks the positions of the items disposed in the home screen 12, and may intuitively grasp the positions of the items the user performs.

Referring to FIG. 29, on setting the lock screen transparently, the user directly checks the region disposed with each item from the home screen displayed below the lock screen, and may alter the flexible display 151 so that the region displayed with the items, the user wants, is bent. On the other hand, when, on setting the lock screen self to the semitransparent state, the lock screen is displayed, the controller 180 may control so that the home screen is always exposed below the lock screen. At this time, when the specific control inputs are received in the state of displaying the lock screen, the controller 180 may change the lock screen in the semitransparent state. For example, when the bending of the flexible display 151 is received, the controller 180 may change the lock screen in the semitransparent state and therefore may expose the home screen.

On the other hand, when the item, the user selects, is absent in the page being displayed on the home screen, the user may scroll the page on the home screen, displayed below the lock screen, having the semitransparent state using the touch gesture such as the flicking. That is, when the control inputs, related to a page scroll, such as the flicking are received in the state of displaying the lock screen, the controller 180 scrolls the page on the home screen and may display the scrolled page below the lock screen.

FIGS. 30A and 30B show an example of scrolling the page on the home screen in the state of displaying the lock screen. Referring to FIGS. 30A and 30B, as shown in FIG. 30A, the controller 180 receives the inputs such as the flicking in the state of exposing the specific page P1 on the home screen below the lock screen having the semitransparent state. Therefore, as shown in FIG. 30B, the controller 180 scrolls the page on the home screen in the flicking direction and therefore displays different page P2 on the screen.

Referring back to FIG. 28, at the step S301, to improve the convenience of selecting the item for the user, the controller 180 may display at least one item for quickly performing the function in the position different from each other on the lock screen. Here, the item displayed on the lock screen is set as the bookmark by the user or may include the shortcut icon or the widget etc. to which the applications being performed or currently performed are corresponded.

Figure 31:
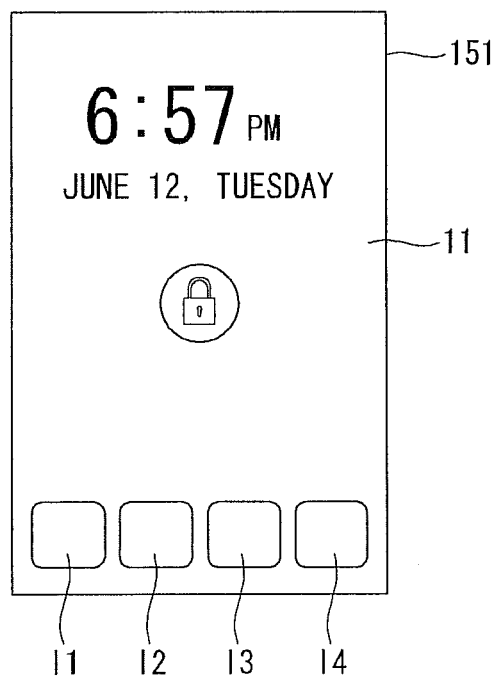
FIG. 31 shows an example of displaying predetermined items on a lock screen.
Figure 32:
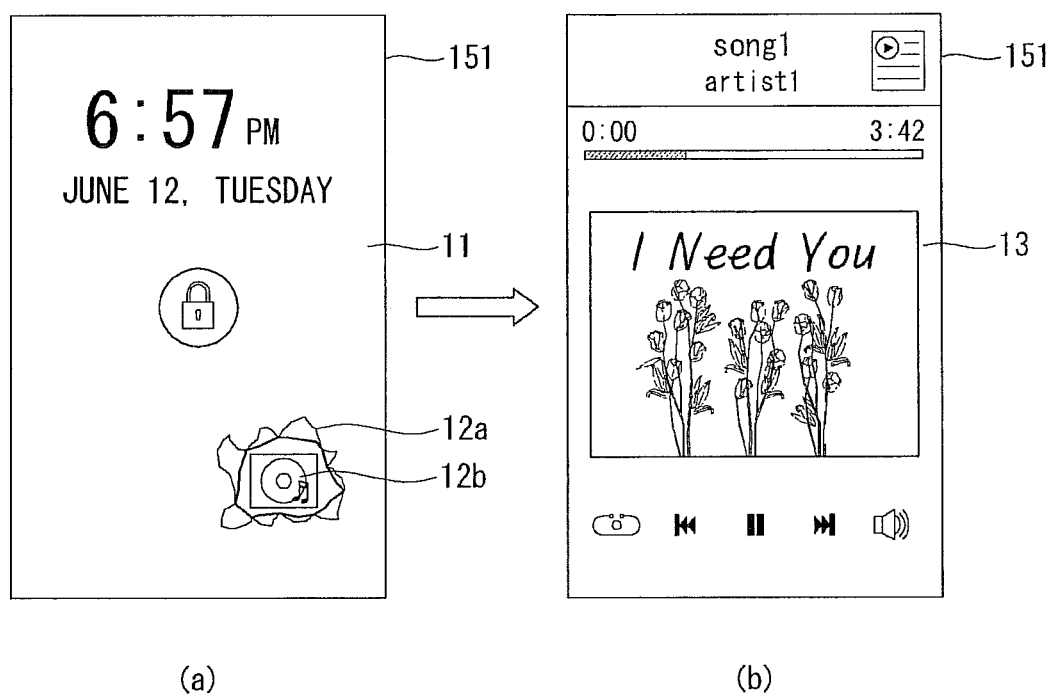
Figure 33:
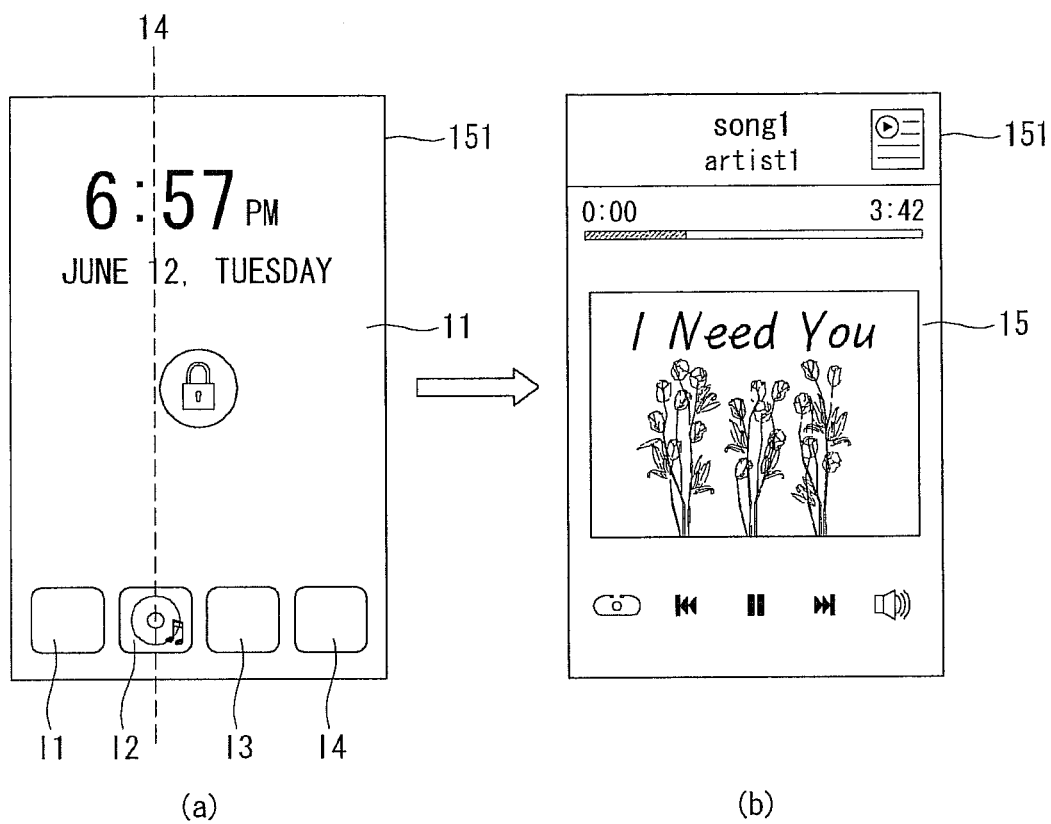

FIG. 31 shows an example for displaying the item predetermined in advance on the locked screen. Referring to FIG. 31, the controller 180 displays the items I1 to I4 capable of quickly performing below the lock screen 11. Here, on selecting the item using the bending of the flexible display 151, to improve the convenience of selecting, the controller 180 corresponds each item to rows different from each other.

As shown in FIG. 31, on displaying the item capable of quickly performing on the lock screen, the user directly checks the positions of each item displayed on the lock screen, and may alter the flexible display 151 so that the region of displaying the item, the user wants, is bent. On the other hand, when the specific control inputs are received in the state of displaying the lock screen, the controller 180 may display the item for quickly performing on the lock screen. For example, when the bending of the flexible display 151 is received, the controller 180 may display the item for quickly performing on the lock screen.

Referring back to FIG. 28, at the step S303, when the item disposed in the bent region is multiple, the controller 180 may select any one item according to the bending degree. That is, the item disposed in the positions having a large bending degree of the bent region may be preferentially selected.

FIG. 32A to 33B show examples of performing by selecting any one item based on the bending state of the flexible display in the screen lock state. Referring FIGS. 32A and 32B, when the bending of the flexible display 151 is generated, the controller 180 acquires a bending region 12a in which the bending is generated, and the item 12b positioned in the bending region 12a on the home screen. Referring FIG. 32A, the item positioned in the bending region 12a is the shortcut icon to which the performance function for the music reproducing application is corresponded.

On the other hand, the controller 180, as shown in FIG. 32A, tears the lock screen 11 centered on the bending region 12a and displays the item 12b on the home screen into the torn region. Then, as shown in FIG. 32B, the controller 180 releases the lock state and directly performs the music reproducing application. Further, the controller 180 displays a performance screen 13 for the music reproducing application on the flexible display 151.

Referring FIGS. 33A and 33B, when the bending of the flexible display 151 is generated, the controller 180 acquires the bending region. Further, as shown in FIG. 33A, the controller 180 acquires the reference line 14 for selecting the item based on the bending region, and selects the item overlapped with the reference line 14 of the items I1 to I4 displayed on the lock screen 11. That is, the controller 180 selects an icon 12 to which the performance function for the music reproducing application is corresponded.

Therefore, as shown in FIG. 33B, the controller 180 releases the lock state and directly performs the music reproducing application. Further, the controller 180 displays the performance screen 13 for the music reproducing application on the flexible display 151.

Figure 34:
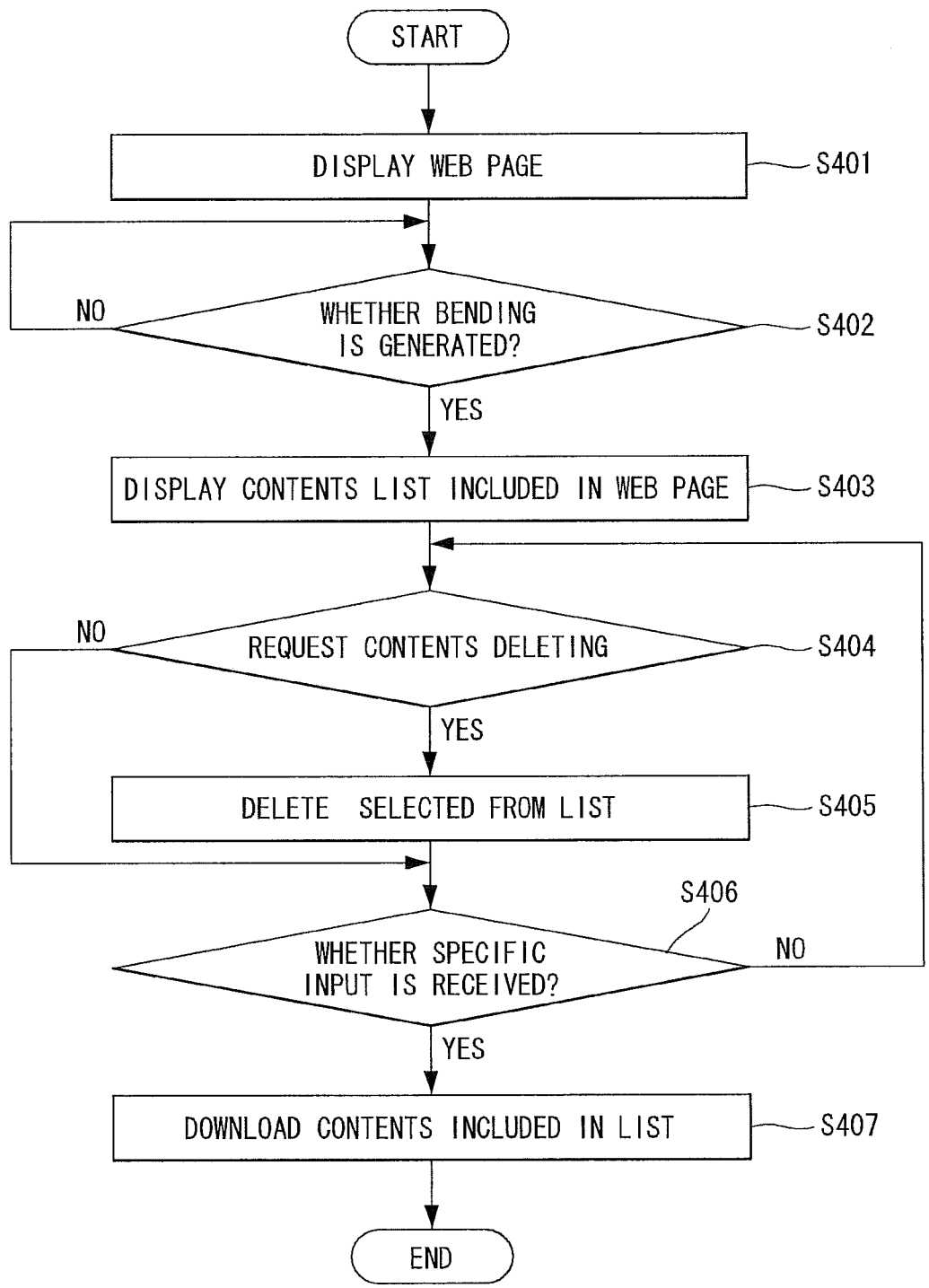
FIG. 34 shows another embodiment of a method of controlling a terminal.

FIG. 34 shows embodiments of methods of controlling a mobile terminal, and FIGS. 35A to 37 explain the methods shown in FIG. 34. Referring to FIG. 34, the controller 180 displays the specific web page on the flexible display 151 (S401).

The controller 180 may determine whether the bending of the flexible display 151 occurs, based on the output signals of the bend sensing unit included in the sensing unit 140 (S402).

When the generation of the bending is sensed, the controller 180 displays a contents list included with at least one contents included in the web page being displayed (S403). Here, the contents may include images, moving pictures, audio files, electronic documents etc. Then, when at least one contents is selected from the contents list and a request for deleting the selected contents is received (S404), the controller 180 deletes at least one contents selected from the contents list (S405).

On the other hand, when the specific control inputs are received in the state of displaying the contents list (S406), the controller 180 downloads at one time at least one contents included in the contents list being displayed from the web pages and records the downloaded contents into the memory 160 (S407). Further, when the contents recording is completed, the controller 180 restores the display state of the web page into the state before the bending is generated.

At the step S402, the controller 180 may overlap the contents list with the specific region of the web page. Further, the controller 180 divides the web page being displayed into a plurality of regions based on the bending state, and may move the divided regions to display the contents list between the divided regions. In the latter case, the controller 180 may divide the web pages by the method similar with the step S103 in FIG. 3 described above.

FIG. 35A to 35C show an example of displaying contents list.

Referring to FIGS. 35A to 35C, the controller 180 is operated in the state of displaying the web page 21 as shown in FIG. 35A and acquires the reference line 24 for dividing the web page 21 into a plurality of regions based on the bending state information when the bending of the flexible display 151 is generated. Further, as shown in FIG. 35B, the controller 180 divides the web page 21 into a plurality of regions 21a, 21b centered on the reference line 24, and moves the divided regions 21a, 21b in different direction from each other to display a new screen 22 between the divided regions 21a, 21b. Further, the controller 180 moves contents C1 to C4 included in the web page 21 to a newly exposed screen 22. As shown in FIG. 35C, the moved contents C1 to C4 are rearranged on the region 22 newly exposed while dividing the web page 21.

Referring to 35B and 35C, on moving the contents C1 to C4 positioned in the web page 21 into the newly exposed region 22, the controller 180 may intuitively display the action of moving the contents C1 to C4 into the newly exposed region 22 by displaying an original position on the web page 21 of each contents C1 to C4 as an empty space.

Figure 35:
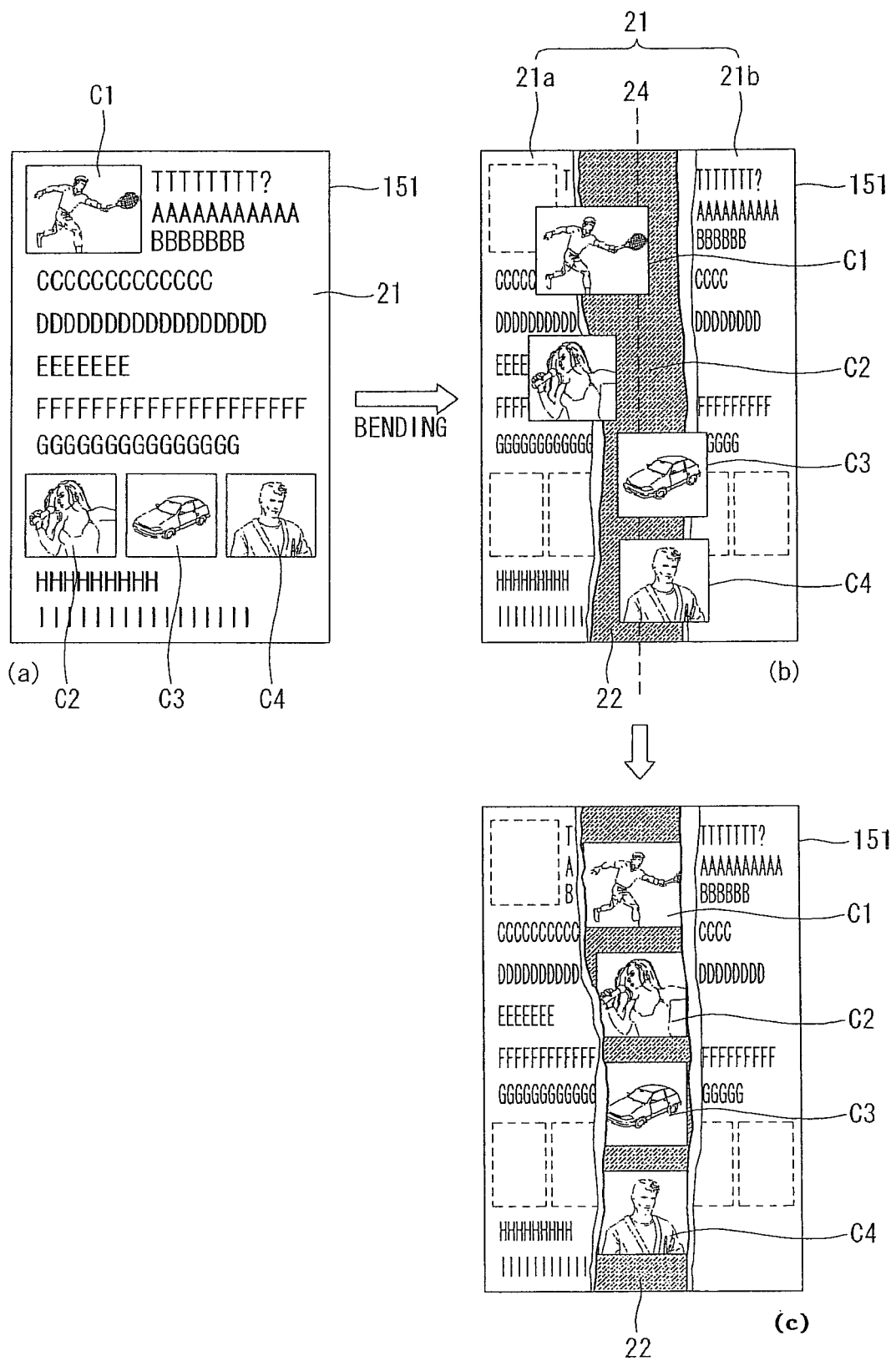
FIGS. 35A to 35C show an example of displaying a contents list in a terminal.
Figure 36:
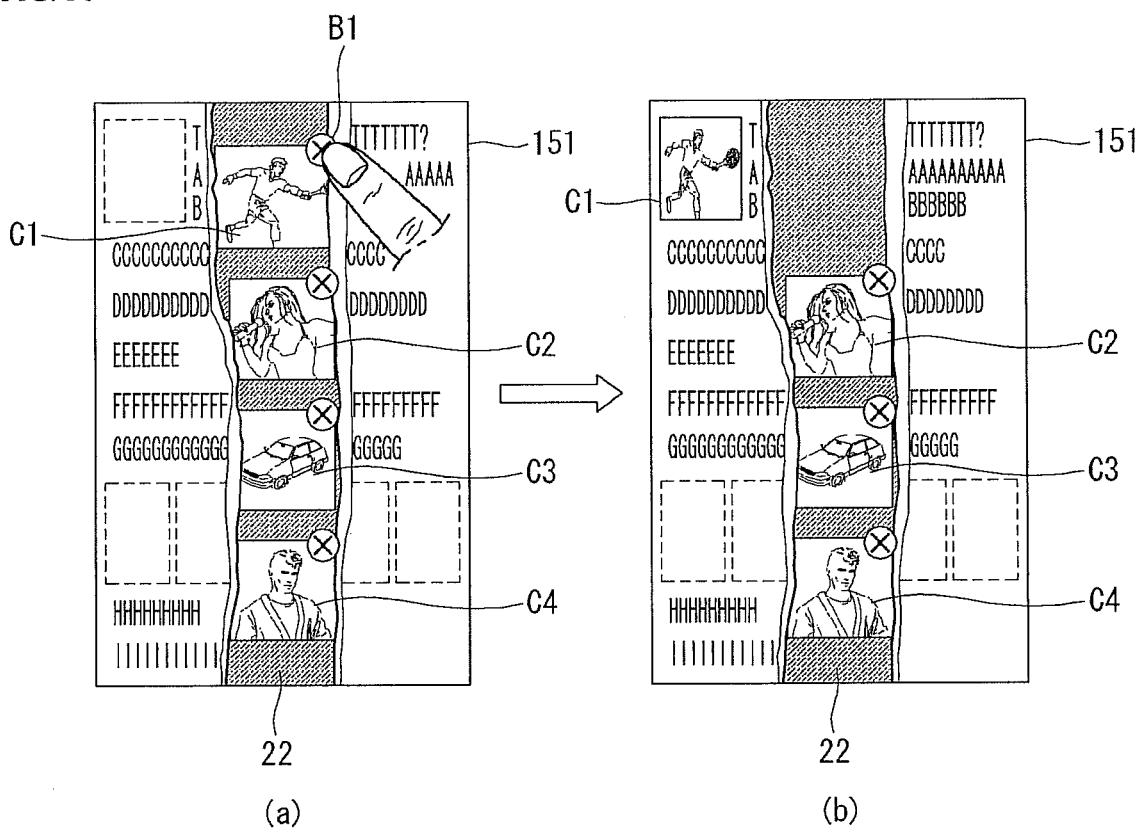
FIGS. 36A and 36b show an example of deleting a contents list in a terminal.

On the other hand, since the method for dividing the web page and moving the divided regions in FIG. 35 is similarly performed with the method for dividing the first screen and moving the divided regions in other embodiments described herein, the detailed description for the similar content is omitted hereinafter.

Referring back to FIG. 34, at the step S403, the controller 180 may display each contents included in the contents list together with a deleting button. Therefore, when the deleting button is touched at the step S404, the controller 180 may remove the contents touched by the deleting button from the contents list.

FIGS. 36A and 36B show an example of deleting the contents from the contents list. Referring to 36B and 36C, on gathering the contents included in the web page into the newly exposed region 22, as shown in FIG. 36A, the controller 180 may display the deleting button B1 in correspondence with each contents. Further, when the deleting button B1 corresponding to any one content C1 of the contents list is touched, as shown in FIG. 36B, the controller 180 deletes the corresponding contents C1 from the contents list. In addition, the contents C1 deleted from the contents list is displayed again into the original position of the web page. That is, the contents deleted from the contents list moves from the contents list to the original position of the web page.

Referring back to FIG. 34, at the step S406, when the bent flexible display is restored into the original state, that is, is unfolded, inputs for recording the contents may be inputted. Further, at the step S402, when the flexible display 151 is bent in a opposition direction to the bending direction, the input for recording the contents may be inputted.

Figure 37:
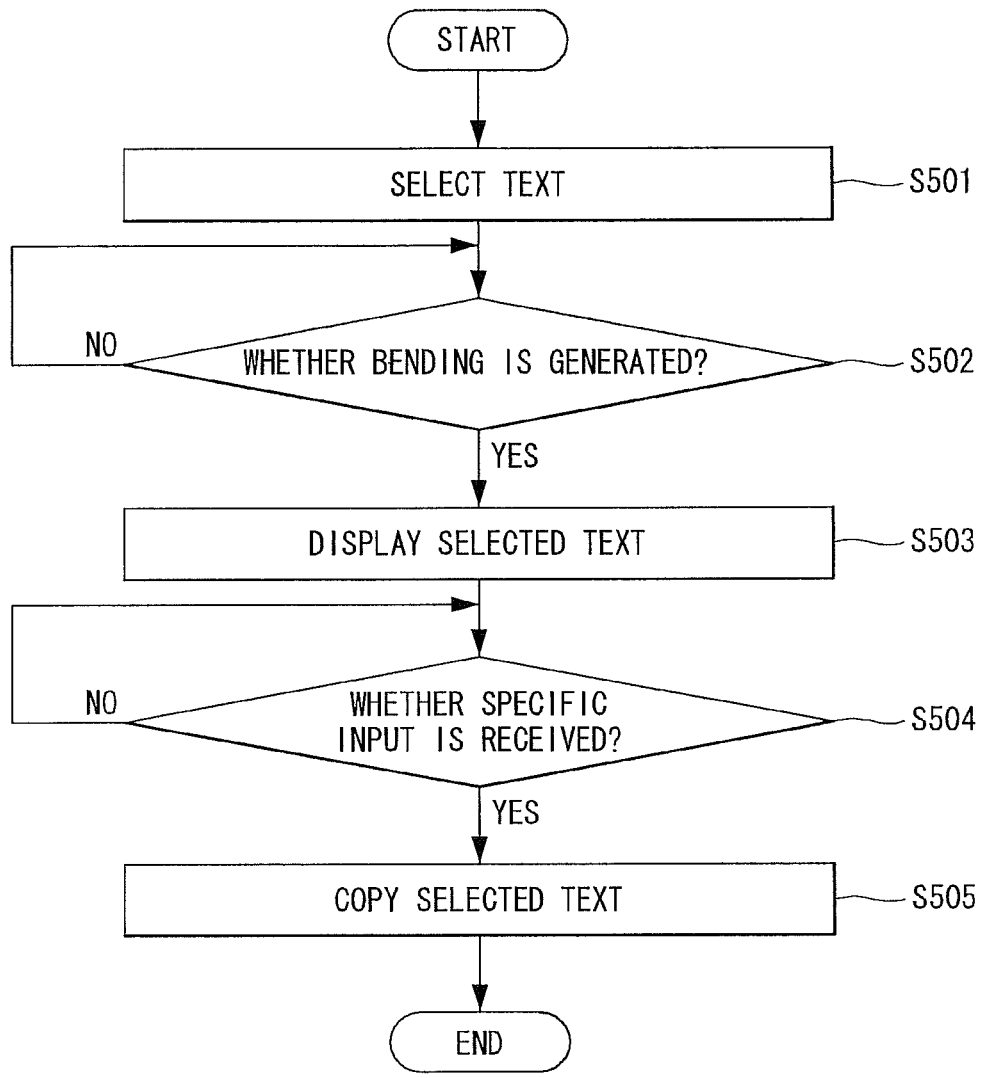
FIG. 37 shows another embodiment of a method of controlling a terminal.
Figure 38:
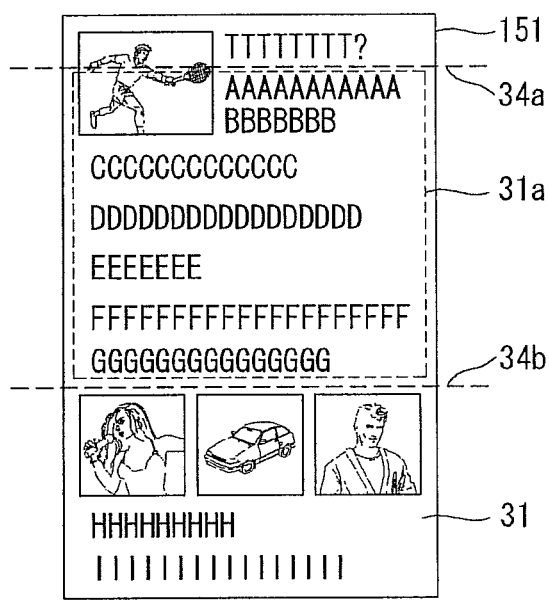
FIG. 38 shows an example of selecting a text in the mobile terminal.
Figure 39:
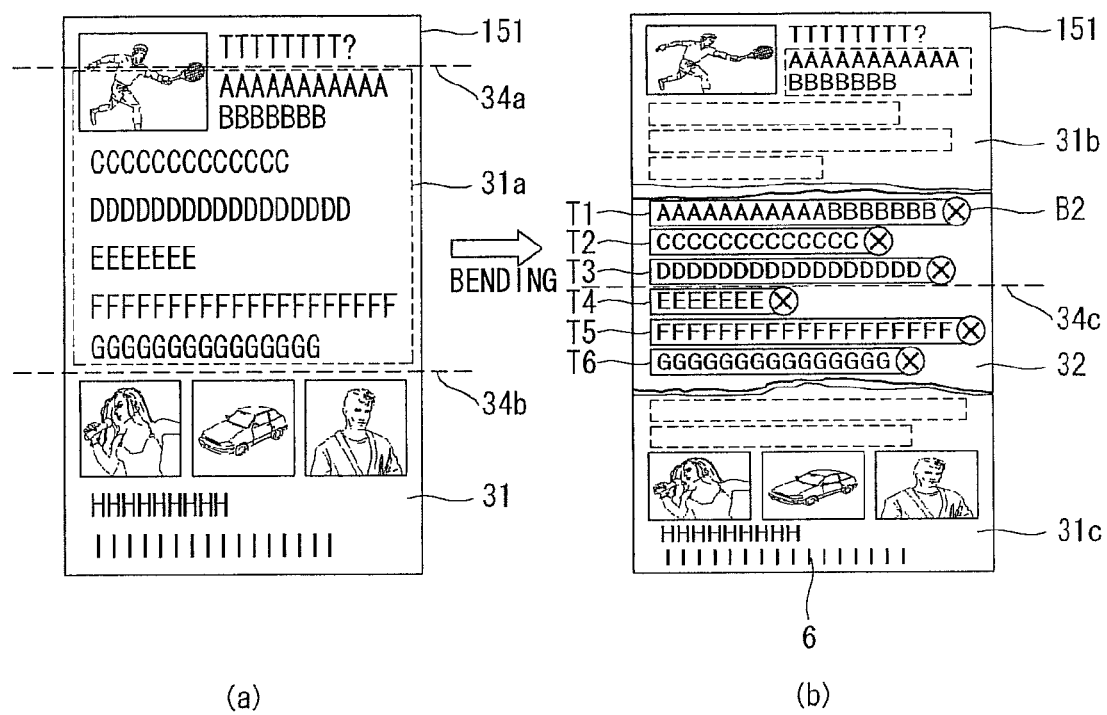
FIGS. 39A and 39B show displaying a text list selected from the terminal.

FIG. 37 shows embodiments of a method of controlling a mobile terminal, and FIGS. 38 to 39B explain the methods shown in FIG. 37. Referring to FIG. 38, the controller 180 selects at least one text from the screen being displayed (S501).

In addition, the controller 180 may determine whether the bending of the flexible display 151 occurs, based on the output signals of the bend sensing unit included in the sensing unit 140 (S502). When the generation of the bending is sensed in the state of selecting the text, the controller 180 displays at least one selected text into the part of the screen (S503).

Then, when the specific control inputs are received in the state of displaying at least one selected text (S504), the controller 180 copies the selected text (S505). Further, when the copy is completed, at the step S502, the controller 180 restores into the screen state before the bending is generated.

At the step S501, the controller 180 may select the text based on the bending of the flexible display 151 generated in the state of not selecting the text. For example, when the user unfolds a plurality of regions becoming a boundary of the region to designate the region, the controller 180 selects the specific region based on the bending region and may select the text displayed in the selected region.

Further, the controller 180 may also select the text based on the touch gestures. For example, when the user selects the region using multi touch gestures etc., the controller 180 may select the text displayed in the selected region.

Further, when the specific inputs such as the generation of the bending, touch inputs, the specific key inputs etc. for the flexible display 151 are received, the controller displays an indicator such as a selecting bar for selecting the text on the screen and may select the text using the indicator. In this case, when the bending region of the flexible display 151 is moved or the mobile terminal 100 is tilted, the controller 180 may change the text to be selected by moving the indicator.

FIG. 38 shows an example of selecting the text.

Referring to FIG. 38, when the user bends different two regions on the flexible display 151 in the state of displaying the web page 31, the controller 180 acquires information for the regions in which the bending is generated. In addition, the controller 180 acquires the reference line 34a, 34b for selecting the text for each bending region based on the acquired bending region information and selects the region 31a, the user wants to copy, of the text based on the acquired reference line.

On the other hand, according to one embodiment, when the region, the user wants to copy, of the text or the text, the user wants to copy, is selected, the controller 180, as shown in FIG. 38, may highlight the selected regions 31a or the selected text to intuitively recognize the selected regions or text.

Referring back to FIG. 37, at step S503, controller 180 displays in overlapping relation at least one selected text into the specific region of the current screen, divides the screen being displayed into a plurality of regions based on the bending state, and moves the divided regions to display the selected text list between the divided regions. In the latter case, the controller 180 may divide the web pages by the method similar with the step S103 in FIG. 3 described above.

FIGS. 39A and 35B show an example of displaying a text list to be selected.

Referring to FIGS. 39A and 39B, the controller 180 is operated in the state of selecting the specific region 31a of the web page 31 as shown in FIG. 39A and acquires the reference line 34c for dividing the web page 21 into a plurality of regions based on the bending state information when the bending of the flexible display 151 is generated.

Further, as shown in FIG. 39B, the controller 180 divides the web page 31 into a plurality of regions 31b, 31c centered on the reference line 34c, and moves the divided regions 31b, 31c in different direction from each other to expose a new screen 32 between the divided regions 31b, 31c.

Further, as shown in FIG. 39B, the controller 180 moves the texts T1 to T6 included in the specific region 31a of the web page 31 into the newly exposed screen 32. Further, each of the selected texts T1 to T6 may be corresponded with the deleting button B2 for deleting the text.

On the other hand, referring to 39B, on moving the texts T1 to T6 of the selected region into the newly exposed region 32, the controller 180 may intuitively display an action of moving the texts T1 to T6 into the newly exposed region 22 by displaying an original position on the web page 32 of each text as an empty space.

On the other hand, since the method of dividing the web page and moving the divided regions in FIG. 39 is similarly performed with the method for dividing the first screen and moving the divided regions in other embodiments described herein, the detailed description for the similar content is omitted hereinafter.

Referring back to FIG. 37, at the step S503, the controller 180 may display each of the selected text together with a deleting button. Further, when the deleting button is touched, the controller 180 may release the selection for the text into which the deleting button is touched. Here, the method of deleting the specific text using the deleting button is similarly performed with the method of deleting the specific contents using the deleting button in FIG. 36 described above, and therefore, the detailed description for the similar content is omitted hereinafter.

Referring back to FIG. 37, at the step S504, the specific input for copying the selected text may be inputted in various ways. For example, when the bent flexible display 151 is restored into the original state, that is, the bent flexible display 151 is unfolded, the specific input for copying the text may be inputted. Further, for example, when the bending of the flexible display 151 is generated in the opposite direction to the bending direction at the step S 502, the specific input for copying the selected text may be inputted.

Figure 40:
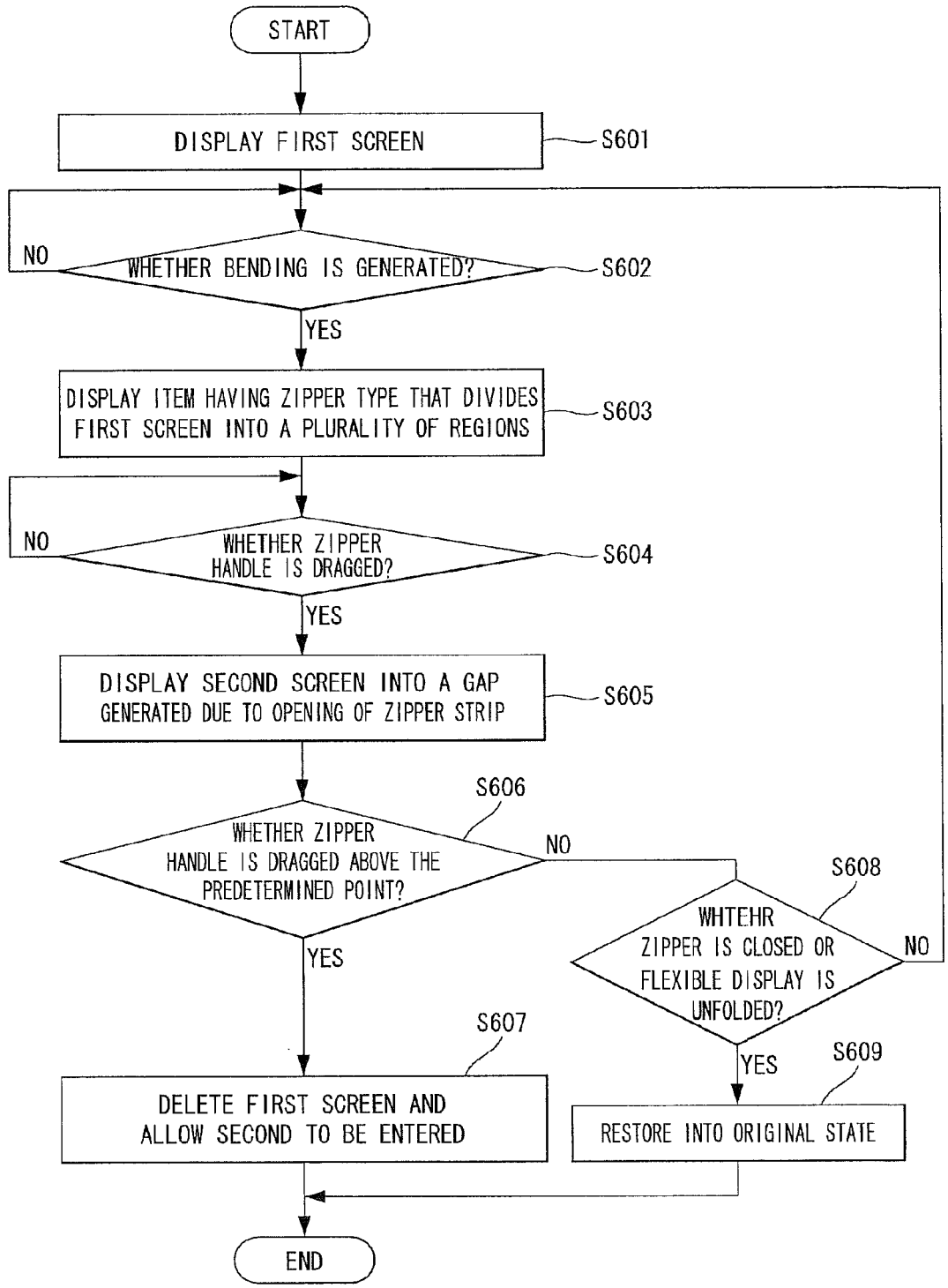
FIG. 40 shows another embodiment of a method of controlling a terminal.
Figure 41:
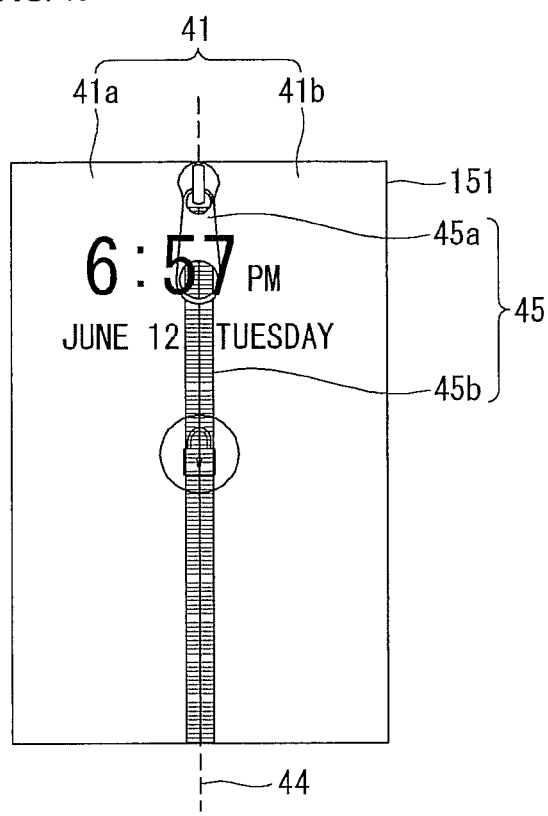
FIG. 41 shows an example of displaying a zipper item in a mobile terminal.
Figure 42:
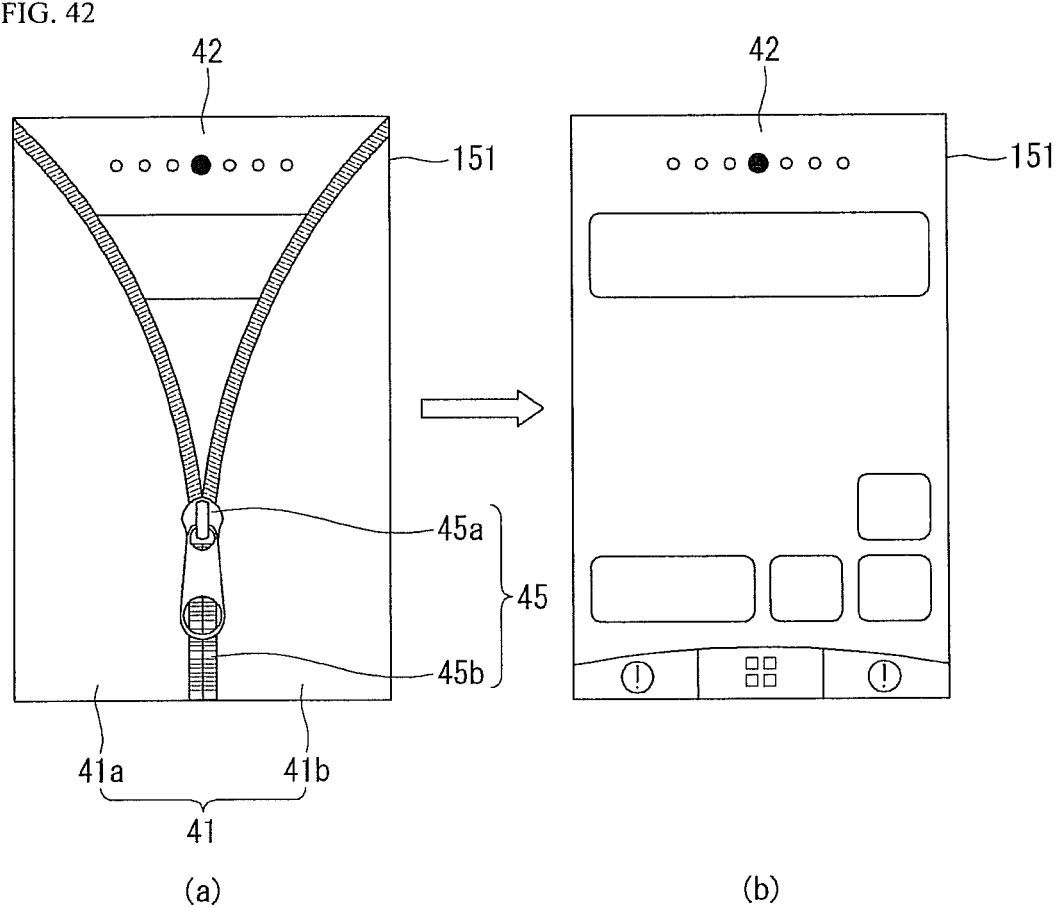
FIGS. 42A and 42B show entering a second screen using the zipper item.

FIG. 40 shows embodiments of methods of controlling a mobile terminal, and FIGS. 41 to 42B explain the methods shown in FIG. 40. Referring to FIG. 40, the controller 180 displays the first screen on the flexible display 151 (S601).

In addition, the controller 180 may determine whether the bending of the flexible display 151 occurs, based on the output signals of the bend sensing unit included in the sensing unit 140 (S602).

When the generation of the bending is sensed, the controller 180 displays the item having a zipper type that divides the first screen into a plurality of regions (S603). The item having a zipper type includes a zipper strip, and a zipper handle, positioned on the zipper strip, for opening or closing a zipper. At the beginning of displaying the zipper item, the zipper handle is displayed in the position corresponding to the state of perfectly closing the zipper strip.

When the zipper handle is touched and is dragged in the specific direction, that is, the direction of opening the zipper strip (S604), the controller 180 displays the zipper item to gradually open the zipper strip according to the distance to be dragged by the zipper handle. Further, when the zipper strip is opened, the controller 180 moves the divided regions of the first screen to display the second screen into a gap generated due to the opening of the zipper strip (S605). Here, the second screen may be implemented in various embodiments, and the various embodiments may include all the embodiments of the second screen described herein.

The controller 180 persistently checks persistently the position of the zipper handle and therefore determines whether the zipper handle is dragged above the predetermined point (S606). Further, when the zipper handle is dragged above the predetermined point, the controller 180 removes the first screen and allows the second screen to be entered (S607).

On the other hand, the zipper handle is dragged in the direction of perfectly closing the zipper strip or the flexible display 151 is unfolded (S608), the controller 180 restores the screen into the state before the flexible display 151 is bent (S609). That is, when the zipper strip is closed or the flexible display 151 is restored into the state before the flexible display 151 is bent, the controller 180 may restore the screen into the state before the flexible display 151 is bent.

At the step S603, when the bending is generated, the controller 180 acquires the reference line for dividing the first region based on the bending region, and divides the first region based on the acquired reference line. Further, it is possible to display the zipper item so the zipper item is overlapped with the boundary of the divided regions, that is, the reference line.

FIG. 41 shows an example of displaying the zipper item.

Referring to FIG. 41, the controller 180 acquires a reference line 44 for dividing a lock screen 41 being displayed when the bending of the flexible display 151 occurs. Further, the controller 180 displays the zipper item 45 so that the zipper item 45 is overlapped with the reference line 44. On the other hand, the method of acquiring the reference line 44 for dividing the screen may be similarly performed with the method of acquiring the reference line for dividing the screen in other embodiments described herein, and therefore, the detailed description for the similar content is omitted hereinafter.

The zipper item 45 acts as the region dividing line for dividing the first screen 41 into a plurality of regions 41a, 41b, and includes a zipper handle 45a and a zipper strip 45b for dividing or coupling the first screen 41 by opening or closing the zipper strip 45b. According to the one embodiment, the controller 180 appears the second screen on the screen or disappears from the screen by dragging the zipper handle 45a and therefore opening or closing the zipper strip 45b.

FIGS. 42A and 42B show an example of entering the second screen using the zipper item. Referring to FIG. 42, the controller 180 displays the zipper item 45 for dividing a lock screen 41 being displayed when the bending of the flexible display 151 occurs. Then, as shown in FIG. 42A, when the zipper handle 45a is dragged along with the zipper strip 45b, the controller 180 opens the zipper strip 45b based on the distance dragged by the zipper handle 45a. Therefore, the divided regions 41a, 41b of the lock screen 41 divided by the zipper item 45 are moved in the direction to be spaced apart from each other along with the zipper strip 45b, and the home screen 42 is exposed between the divided regions 41a, 41b.

On the other hand, when the zipper handle 45a is dragged above the predetermined distance and therefore the zipper strip 45b is opened above the predetermined value, the controller 180 releases the lock state as shown in FIG. 42B.

Further, the controller 180 allows the home screen to be entered by releasing the lock state.

According to one embodiment, the sensing unit 140 may include a pressure sensing unit (a grip sensing unit) in the specific region of the body of the mobile terminal 100. When the user grips the body of the mobile terminal 100 by the user, the pressure sensing unit is disposed in the position for applying pressure, and detects the pressure applied to the body of the mobile terminal 100 by the user.

Figure 43:
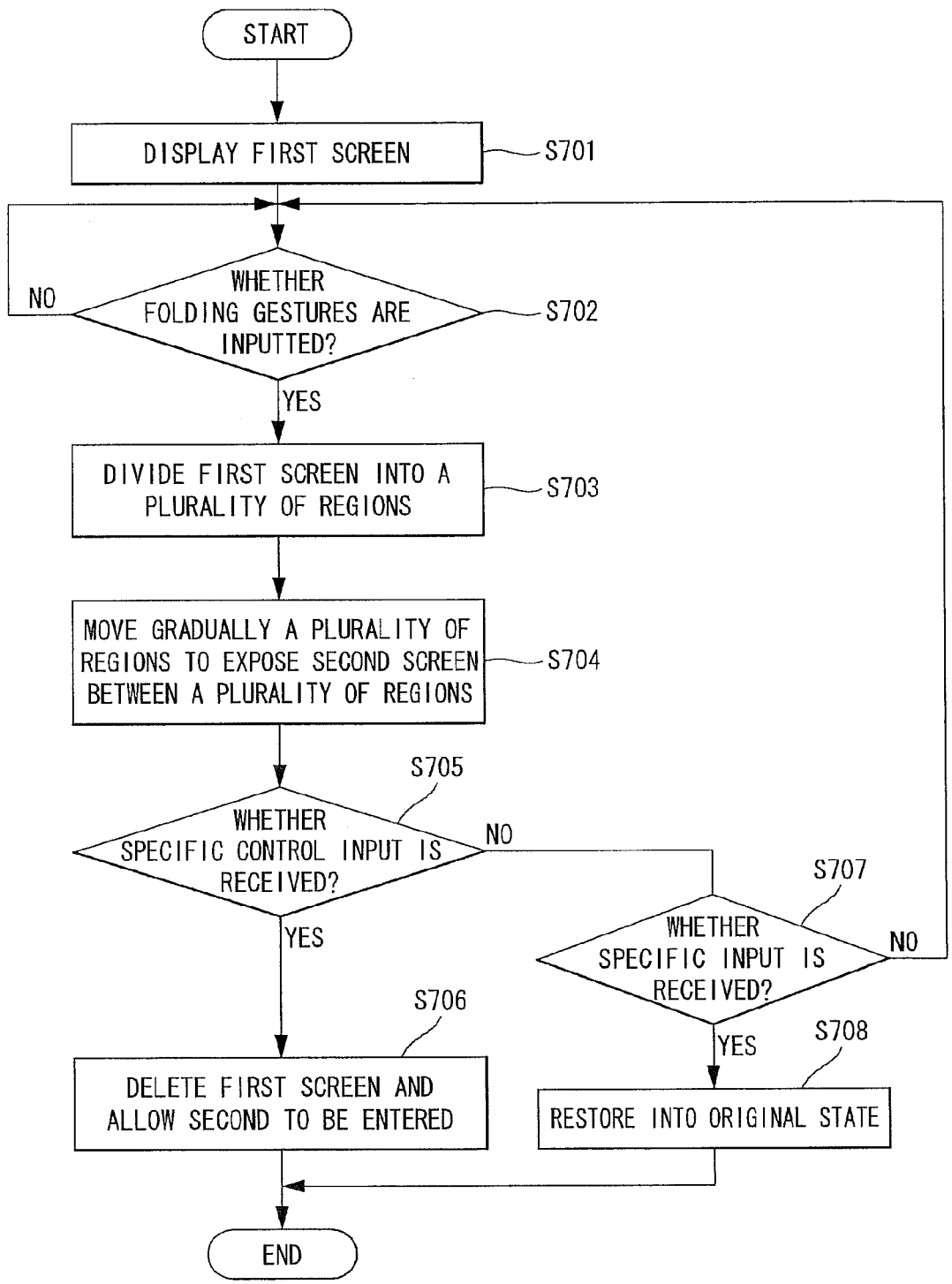
FIG. 43 shows another embodiment of a method of controlling a terminal.
Figure 44:
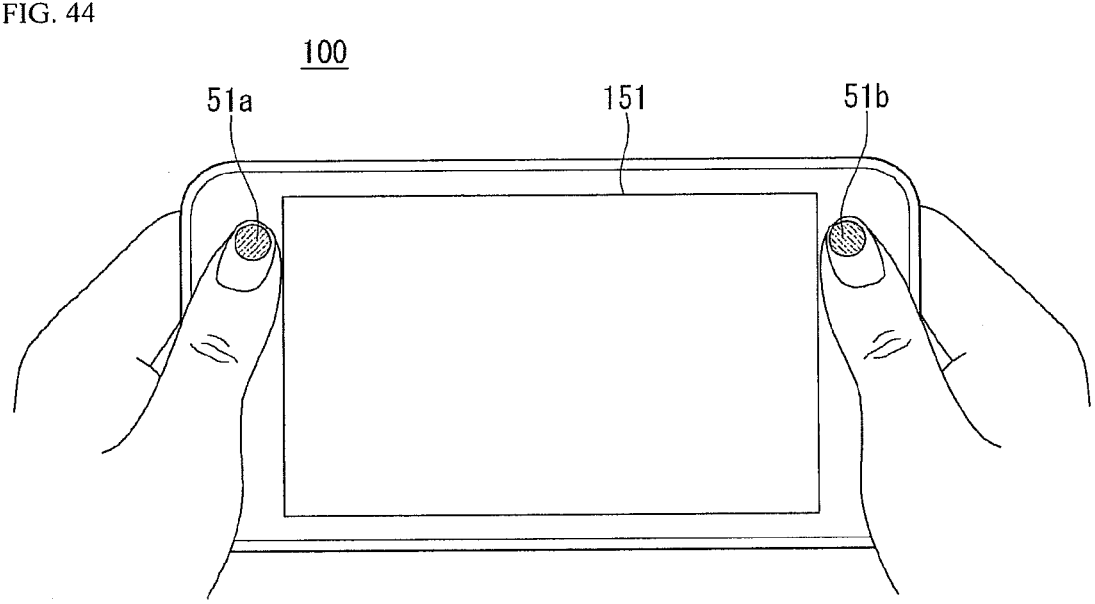
FIG. 44 shows an example of receiving a folding gesture in a mobile terminal.

FIG. 43 shows embodiments of methods of controlling a mobile terminal, and FIG. 44 explains the method shown in FIG. 43. Referring to FIG. 43, the controller 180 displays the first screen by the display module 151 (S701).

The controller 180 monitors the input such as the folding gestures based on the output signal of the pressure sensing unit included in the sensing unit 140 (S702). Here, to prevent malfunction caused by the noise etc., the controller 180 determines that the folding gestures are inputted only when the pressure above the predetermined value is detected by the pressure sensing unit.

When the folding gestures are sensed at the step S702, the controller 180 divides the first screen into a plurality of regions (S703). Further, the controller 180 gradually moves the plurality of divided regions to expose at least part of the second screen between the plurality of divided regions (S704). Here, the second screen may be implemented in various embodiments, and the various embodiments may include all the embodiments of the second screen described herein.

Further, the controller 180 checks whether a plurality of divided region is moved above the predetermined distance (S705), and allows the second screen to be entered when a plurality of divided region is moved above the predetermined distance (S706). That is, the second screen rather than the first screen is displayed into the flexible display 151 as full screen.

On the other hand, the controller 180 checks whether the specific input for restoring into the original state is received in the state of dividing the first screen (S707), and restores the screen into the previous state to the input of the folding gestures when the specific input for restoring the screen is received (S708). That is, the controller 180 removes the second screen and displays the first screen as the full screen by coupling the divided regions of the first screen.

FIG. 44 shows an example of receiving the folding gestures.

Referring to FIG. 44, when the pressure applied to the body of the mobile terminal 100 is sensed, the controller 180 acquires information such as the point for sensing the pressure, and the direction for applying the pressure, etc., and checks whether the pressure to be applied is corresponded to the folding gestures based on the acquired information. That is, referring to FIG. 44, if the pressures above the predetermined value are sensed in the same direction for a plurality of points (51*a*, 51*b*) positioned in both ends of the body of the mobile terminal 100 when the user grips both ends of the body of the mobile terminal 100 and applies the pressures above the predetermined value in the same direction, the controller 180 may determine that the folding gestures are inputted.

Referring back to FIG. 43, at the step S703, the controller 180 divides the first screen based on the predetermined reference line. Here, the method of dividing the first screen is similarly performed as compared with the method of dividing the first screen disclosed in the other embodiments described herein, and therefore, the detailed description for the similar content is omitted hereinafter.

Further, at the step S704, when the first screen is divided into a plurality of regions, the controller 180 moves automatically each region by the predetermined distance or may control the movement of the divided region based on pressure intensity or pressure maintenance time detected by the pressure sensor. In the former case, the controller 180 moves the divided regions apart by the predetermined distance irrespective of the pressure intensity or the pressure maintenance time. On the other hand, in the latter case, the larger the pressure intensity or longer the pressure maintenance time, the controller 180 moves more divided regions.

Further, at the step S704, the controller 180 reduces information displayed on the first screen based on the size of the display region to be reduced on scrolling the divided regions to minimize information loss due to the movement of the divided regions as disclosed in other embodiments herein. That is, on scrolling the divided regions, the controller 180 scrolls at least part of the information being displayed on the first screen into the outside of the screen, thereby to disappear the information from the screen. Further, on scrolling the divided regions, the controller 180 may change a layout of the information displayed on the first screen based on the size of the reduced display region. For example, the controller 180 may alter the layout of the information displayed on the first screen 1 to change the display position of the image or to lengthen the scroll of the text with without changing the size of the text.

Further, at the step S704, the controller 180 moves the divided regions using the touch gestures for the divided regions as disclosed in other embodiments herein. Further, the controller 180 scrolls the second screen displayed between the divided regions based on the movement of the mobile terminal 100. Here, the method of moving the divided regions of the first screen or the second screen using the touch gestures or the movement of the mobile terminal 100 has been described in other embodiments herein, and therefore, the detailed description for it is omitted hereinafter.

Figure 16:
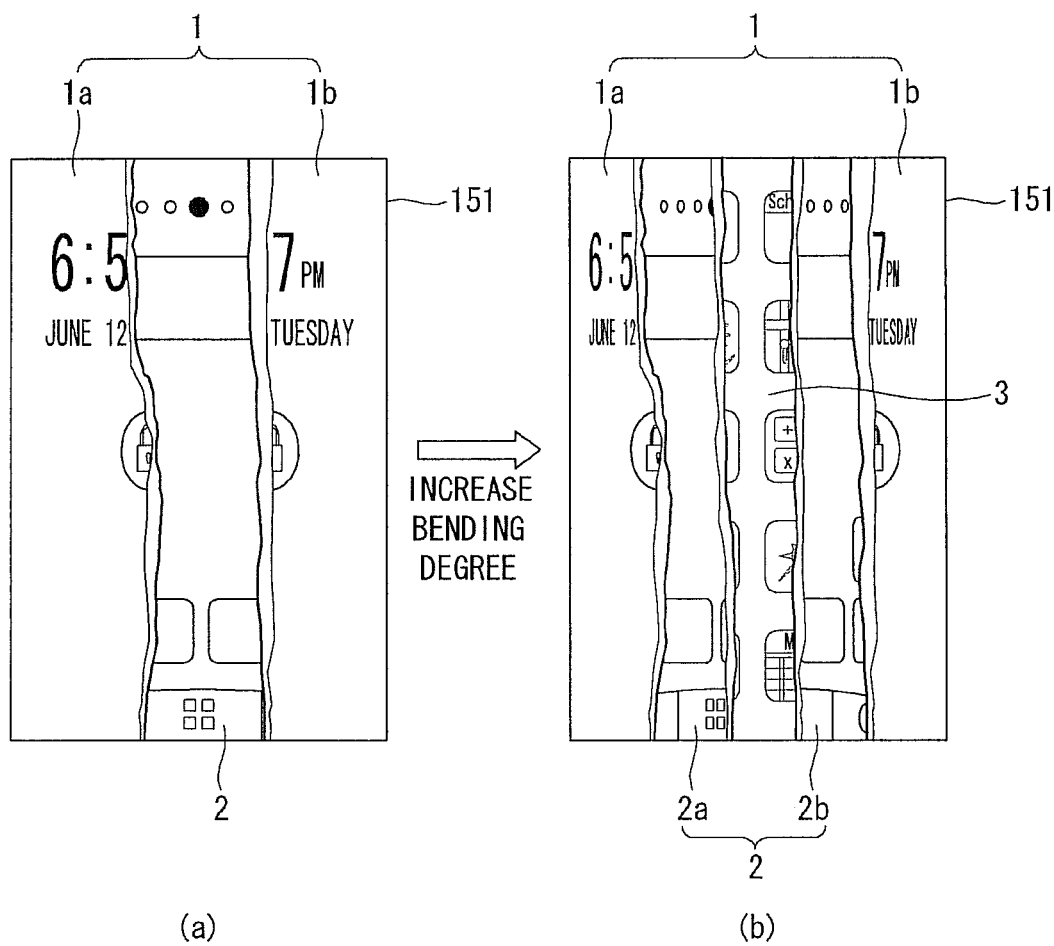
FIGS. 16A and 16B show an example of displaying a third region on the screen in the mobile terminal.
Figure 17:
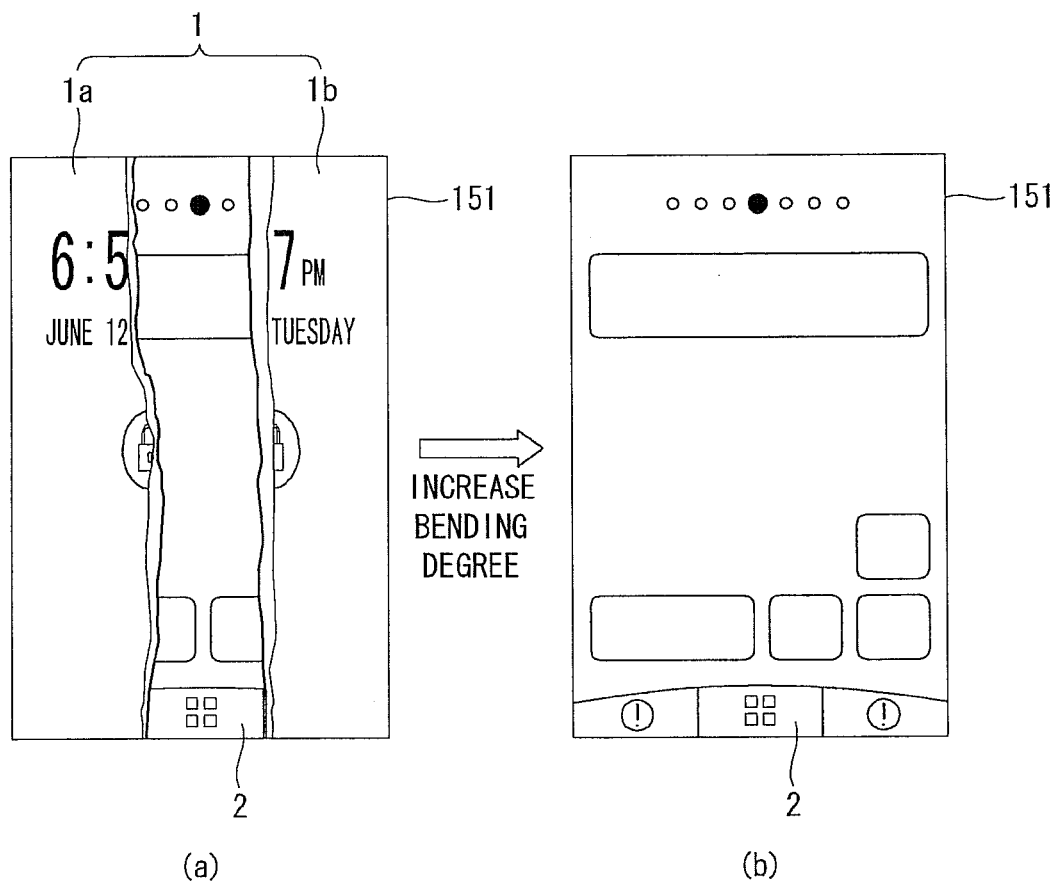
FIGS. 17A and 17B show an example of entering the second screen when a flexible degree exceeds a predetermined value.

Further, at the step S704, when the pressure intensity becomes above the predetermined value or the pressure maintenance time becomes above the predetermined time, as shown in FIG. 16 described above, the controller 180 divides the second screen, and moves the divided regions of the second screen to newly display the third screen between the divided region of the second screen. Here, the third screen may be the screen related hierarchically to the second screen and may be the screen disposed back and forth to the second screen.

On the other hand, when the divided regions of the first screen are moved above the predetermined distance in FIG. 43, the case of entering the second screen, for example, may be performed. When the divided regions of the first screen move above the predetermined distance and the second screen is displayed above the predetermined region, the controller 180 allows the second screen to be entered. Further, when separate control inputs such as touch inputs or the movement inputs of the mobile terminal 100 is received, the controller 180 also allows the second screen to be entered. For example, when the second screen is touched or a body of the mobile terminal 100 is tapped or tilted, the controller 180 may allow the second screen to be entered.

Referring back to FIG. 43, at the step S707, when the user releases the folding gestures in the state of dividing the first screen or the folding gestures of applying the pressure in opposite direction to the direction of the pressure applied in the step S702 are inputted, the controller 180 may restore the screen into the original state. Further, when the specific touch inputs, the key inputs, the movement inputs etc. are received, the controller 180 may restore the screen into the original state.

According to one or more embodiments, in the mobile terminal 100, the current screen is divided in response to the folding gestures of the user and the new screen is appeared between the divided regions, such that it is possible to provide a sensitive user interface that enables the user to tear paper and see next page. Further, it is possible to provide the sensitive user interface of generating the user's interest.

The disclosed methods of controlling the mobile terminal may be written as or otherwise implemented by computer programs to be executed by digital microprocessors. The computer programs may be stored on any one of a variety of computer-readable recording media. The methods of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that may store data and may be read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems such that the computer readable code is stored and executed in a distributed manner.

According to one embodiment, a terminal, comprises a flexible display, a sensor to sense bending of the display, and a controller to control display of information on the display, wherein the controller is to divide a first screen on the display into at least first and second regions when bending of the display is detected by the sensor and is to display at least a portion of a second screen in a space located between the first and second regions.

The controller may determine that the display is bent when a bending degree of the display, determined based on a signal from the sensor, exceeds a predetermined value.

The controller may determine a bending state of the display based on a signal from the sensor; set a reference line based on the bending state; and divide the first screen into the first and second regions based on the reference line, wherein the bending state includes at least one of a bending region, a bending direction, a bending velocity, or a bending degree of the flexible display.

When the bending state satisfies a predetermined condition, the controller may delete the first screen from the flexible display and display the second screen on the display. The controller may control movement distances of the first and second regions according to the bending state.

When a bending region is moved, the controller may to re-set the reference line based on the moved bending region and re-divide the first screen based on the re-set reference line.

When the bending state exceeds a predetermined value, the controller may divide the second screen into a plurality of regions and display a third screen at a location between the regions of the second screen.

When at least one of the first or second regions is touched or dragged, the controller is to move said at least one of the first or second regions based on the touch or a direction of the drag.

In addition, the sensor may sense tilting of the mobile terminal and the controller may scroll the second screen displayed between the first and second regions of the first screen based on the sensed tilting. Also, the controller may restore the first screen into the state before the bending occurred when the display is restored to an unfolded state.

The controller may fix the first and second regions of the first screen into current positions irrespective of a bending state of the display when a specific input is received.

When the second screen is touched, the controller may delete the first screen and expand display of the second screen. When the first screen is a lock screen, the second screen is a previously displayed screen. Additionally, or alternatively, the second screen may be a home screen, may include a previously displayed web page, may include a plurality of application icons, and/or may include at least one document.

The first and second regions may be displayed with a first brightness, and the portion of the second screen between the first and second regions may be displayed with a second brightness greater than the first brightness. Also, the second screen may include one or more images or videos stored in a memory of the mobile terminal.

Also, the first screen may be in a locked state, and the controller may release the locked state of the first screen when a bending state of the display satisfies a predetermined condition. Also, the second screen may include a list of at least one application for multitasking. Also, the controller may activate an application from the list when selected. Also, the first screen may be a web page, and the second screen may include a list of at least one contents in the web page.

Also, the controller may detect a movement distance of at least one of the first or second regions or a separation distance between the first and second regions, and control a size of at least one item on the second screen based on the movement or separation distance.

According to another embodiment, a computer-readable medium stores instructions for causing at least one processor to control a terminal, the instructions comprising first code to sense bending of a flexible display; and second code to control display of information on the display, wherein the second code is control a processor to divide a first screen on the display into at least first and second regions when bending of the display is detected and is to display at least a portion of a second screen in a space located between the first and second regions.

According to another embodiment, a computer-readable medium stores instructions for causing at least one processor to control a terminal, the instructions comprising: first code to sense bending of a flexible display; and second code to control display of information on the display, wherein the second code is control a processor to divide a first screen on the display into at least first and second regions when bending of the display is detected and is to display at least a portion of a second screen at a location between the first and second regions.

The medium further includes third code to perform a predetermined operation when a bending state of the display exceeds a predetermined value, the predetermined operation including dividing the second screen into at least two regions and displaying a third screen at a location between the regions of the second screen.

According to another embodiment, a terminal comprises a flexible display; a sensor to sense bending of the display; and a controller to control display of information on the display. The controller is to divide a first screen on the display into at least first and second regions when bending of the display is detected by the sensor and is to display at least a portion of a second screen in a space located between the first and second regions. When a bending state of the display exceeds a predetermined value, the controller is to divide the second screen into a plurality of regions and display a third screen at a location between the regions of the second screen.

According to another embodiment, a method for controlling a mobile terminal comprises detecting bending of a flexible display; and dividing a first screen on the display into at least first and second regions when bending of the display is detected; and displaying at least a portion of a second screen in a space located between the first and second regions.

In the following description, the suffixes "module" and "unit" are used in reference to components of the mobile terminal for convenience of description and do not have meanings or functions different from each other.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more of the other embodiments.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal, comprising:
    a flexible display having one end and an opposite end;
    a sensor to sense bending of the flexible display; and
    a controller to control display of information on the flexible display, wherein the controller is configured to:
        display a first screen on the flexible display when a bending state of the flexible display does not satisfy a predetermined condition according to a signal from the sensor,
        acquire a reference line based on the bending state of the flexible display when the bending state of the flexible display satisfies a predetermined condition according to the signal from the sensor, and to divide the first screen into a first region, a second region, and a third region based on the reference line, and
        display at least a portion of a first side of the first screen in the first region, at least a portion of a second side of the first screen in the second region, and at least a portion of a second screen in the third region, the first, the second, and the third region extending from the one end of the flexible display to the opposite end of the flexible display,
    wherein the third region is located between the first region and the second region, and
    wherein the reference line is acquired by connecting a plurality of points having a largest bending degree of a bending axis in a bent region.

2. The terminal of claim 1, wherein the controller is to:
    determine that the flexible display is bent when a bending degree of the flexible display, determined based on a signal from the sensor, exceeds a predetermined value.

3. The terminal of claim 1, wherein the controller is to:
    divide the first screen into the first and second regions based on the reference line, wherein the bending state includes at least one of a bending region, a bending direction, a bending velocity, or a bending degree of the flexible display.

4. The terminal of claim 3, wherein:
    when the bending state satisfies the predetermined condition, the controller is to delete the first screen from the flexible display and display the second screen on a whole region of the flexible display.

5. The terminal of claim 3, wherein the controller is to control movement distances of the first and second regions according to the bending state.

6. The terminal of claim 3, wherein when a bending region is moved, the controller is to re-set the reference line based on the moved bending region and re-divide the first screen based on the re-set reference line.

7. The terminal of claim 3, wherein when the bending state exceeds a predetermined value, the controller is to divide the second screen into a plurality of regions and display at least a portion of a third screen at a location between the regions of the second screen.

8. The terminal of claim 1, wherein when at least one of the first or second regions is touched or dragged, the controller is to move said at least one of the first or second regions based on the touch or a direction of the drag.

9. The terminal of claim 1, wherein:
    the sensor is to sense tilting of the terminal, and
    the controller is to scroll the second screen displayed between the first and second regions of the first screen based on the sensed tilting.

10. The terminal of claim 1, wherein the controller is to restore the first screen into the state before the bending occurred when the flexible display is restored to an unfolded state.

11. The terminal of claim 10, wherein the controller fixes the first and second regions of the first screen into current positions irrespective of the bending state of the flexible display when a specific input is received.

12. The terminal of claim 1, wherein:
    when the second screen is touched, the controller is to delete the first screen and expand display of the second screen.

13. The terminal of claim 1, wherein when the first screen is a lock screen, the second screen is a previously displayed screen.

14. The terminal of claim 13, wherein:
    the first screen is in a locked state, and
    the controller releases the locked state of the first screen when the bending state of the flexible display satisfies a predetermined condition.

15. The terminal of claim 1, wherein the second screen is a home screen.

16. The terminal of claim 1, wherein the second screen includes a previously displayed web page.

17. The terminal of claim 1, wherein the second screen includes a plurality of application icons.

18. The terminal of claim 1, wherein the second screen includes at least one document.

19. The terminal of claim 1, wherein:
    the first and second regions are displayed with a first brightness, and the portion of the second screen between the first and second regions is displayed with a second brightness greater than the first brightness.

20. The terminal of claim 1, wherein the second screen includes one or more images or videos stored in a memory of the mobile terminal.

21. The terminal of claim 1, wherein the second screen includes a list of at least one application for multitasking.

22. The terminal of claim 21, wherein the controller activates an application from the list when selected.

23. The terminal of claim 1, wherein:
the first screen is a web page, and
the second screen includes a list of at least one contents in the web page.

24. The terminal of claim 1, wherein the controller is to:
detect a movement distance of at least one of the first or second regions or a separation distance between the first and second regions, and
control a size of at least one item on the second screen based on the movement or separation distance.

25. A terminal comprising:
a flexible display having one end and an opposite end;
a sensor to sense bending of the flexible display; and
a controller to control display of information on the flexible display, wherein the controller is configured to:
display a first screen on the flexible display when a bending state of the flexible display does not satisfy a predetermined condition according to a signal from the sensor,
acquire a reference line based on the bending state of the flexible display when the bending state of the flexible display satisfies the predetermined condition according to a signal from the sensor, and to divide the first screen into a first region, a second region, and a third region based on the reference line, and
display at least a portion of a first side of the first screen in the first region, at least a portion of a second side of the first screen in the second region, and at least a portion of a second screen in the third region, the first, the second, and the third region extending from the one end of the flexible display to the opposite end of the flexible display,
wherein the third region is located between the first region and the second region,
wherein the reference line is acquired by connecting a plurality of points having a largest bending degree of a bending axis in a bent region, and
wherein when the bending state of the flexible display exceeds a predetermined value, the controller is configured to divide the second screen into a plurality of regions and display a third screen at a location between the regions of the second screen.

26. A method for controlling a mobile terminal, comprising:
detecting bending of a flexible display having one end and an opposite end;
displaying a first screen on the flexible display when a bending state of the flexible display does not satisfy a predetermined condition according to a signal from a sensor;
acquiring a reference line based on the bending state of the flexible display when the bending state of the flexible display satisfies the predetermined condition according to the signal from the sensor;
dividing the first screen into a first region, a second region, and a third region based on the reference line; and
displaying at least a portion of a first side of the first screen in the first region, at least a portion of a second side of the first screen in the second region, and at least a portion of a second screen in the third region, the first, the second, and the third region extending from the one end of the flexible display to the opposite end of the flexible display,
wherein the third region is located between the first region and the second region, and
wherein the reference line is acquired by connecting a plurality of points having a largest bending degree of a bending axis in a bent region.

* * * * *